(12) United States Patent
Bae et al.

(10) Patent No.: US 11,859,896 B2
(45) Date of Patent: *Jan. 2, 2024

(54) VACUUM ADIABATIC BODY AND REFRIGERATOR

(71) Applicant: LG ELECTRONICS INC., Seoul (KR)

(72) Inventors: Jaehyun Bae, Seoul (KR); Minsu Ryu, Seoul (KR); Jangseok Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/900,081

(22) Filed: Aug. 31, 2022

(65) Prior Publication Data

US 2023/0003438 A1 Jan. 5, 2023

Related U.S. Application Data

(63) Continuation of application No. 16/981,980, filed as application No. PCT/KR2019/007758 on Jun. 26, 2019, now Pat. No. 11,466,926.

(30) Foreign Application Priority Data

Jun. 27, 2018 (KR) .................. 10-2018-0074252

(51) Int. Cl.
*F16L 59/065* (2006.01)
*F25D 23/06* (2006.01)
*F16L 59/08* (2006.01)

(52) U.S. Cl.
CPC .......... *F25D 23/066* (2013.01); *F16L 59/065* (2013.01); *F16L 59/08* (2013.01);
(Continued)

(58) Field of Classification Search
None
See application file for complete search history.

(56) References Cited

U.S. PATENT DOCUMENTS 8,765,247 B2 7/2014 Park
2004/0226956 A1 11/2004 Brooks
(Continued)

FOREIGN PATENT DOCUMENTS

JP 2012-207682 A 10/2012
KR 10-0343719 6/2002
(Continued)

OTHER PUBLICATIONS

International Search Report and Written Opinion dated Oct. 15, 2019 issued in Application No. PCT/KR2019/007758.
(Continued)

*Primary Examiner* — Alexander S Thomas
(74) *Attorney, Agent, or Firm* — KED & ASSOCIATES, LLP

(57) ABSTRACT

An vacuum adiabatic body includes a first plate, a second plate, and a support configured to maintain a vacuum space between the first and second plates. The support includes a support plate supported on an inner surface of one of the first plate and the second plate and a bar extending from the support plate. The bar contacts an inner surface of the other of the first plate and the second plate. The one end of the bar has a cross-section less than that of the other end of the bar.

19 Claims, 17 Drawing Sheets

(52) U.S. Cl.
CPC .. *F25D 2201/1282* (2013.01); *F25D 2201/14* (2013.01); *Y10T 428/231* (2015.01)

(56) References Cited

U.S. PATENT DOCUMENTS

| | | |
|---|---|---|
| 2006/0207212 A1 | 9/2006 | Durney |
| 2010/0251653 A1 | 10/2010 | Mills |
| 2013/0105494 A1 | 5/2013 | Jung |
| 2015/0030800 A1 | 1/2015 | Jung et al. |
| 2017/0009960 A1 | 1/2017 | Ahn et al. |
| 2018/0224195 A1 | 8/2018 | Jung et al. |
| 2018/0224197 A1 | 8/2018 | Jung et al. |
| 2018/0231300 A1 | 8/2018 | Jung et al. |
| 2018/0356147 A1 | 12/2018 | Jung et al. |

FOREIGN PATENT DOCUMENTS

| | | |
|---|---|---|
| KR | 10-2015-0012712 | 2/2015 |
| KR | 10-2017-0005537 | 1/2017 |
| KR | 10-2017-0016244 | 2/2017 |
| WO | WO 2017/023090 | 2/2017 |
| WO | WO 2017/023094 | 2/2017 |

OTHER PUBLICATIONS

Extended European Search Report dated Feb. 17, 2022 issued in Application 19827487.0.
U.S. Office Action dated Mar. 3, 2022 issued in U.S. Appl. No. 16/981,980.

FIG. 4

| Group | | General plastic | | | | Engineering plastic | | | |
|---|---|---|---|---|---|---|---|---|---|
| Material | | (HD)PE ※G-Plastic Reference | PC | Glass fiber PC (30% Glass-F) | ※Low outgassing PC | PCTFE | PPS | LCP | PEEK |
| Out-gassing rate | TML(%) | 0.58 | 0.19 | 0.14 | No Data | 0.01 | 0.06 | 0.06 | 0.26 |
| Compressive Strength | MPa | 31.7 | 82.8 | 124.1 | *80.6 | 37.9 | 107.0 | *151.1 | 137.9 |
| Thermal Conductivity | W/m-k | <0.40 | 0.18 | 0.18 | 0.18 | 0.20 | 0.3 | 0.36 (G/F 50%) | 0.25 |
| Strength /Cond. | MPa-m-k/W | 79 | 460 | 689 | 448 | 189 | 357 | 420 | 552 |
| Heat Deflection Temp at 264 psi | °C | 80 | 132 | 146 | 125 | 126 | 121 | 105 ~ 260 | 160 |
| Max Operating Temperature | °C | 82 | 121 | 132 | No Data | 132 | 218 | No Data | 249 |
| *Cost(per 1kg) | | Low | $3.1 | $6.2(G/F20%) | $6.7 | High | $30 | $40 | $150 |

# VACUUM ADIABATIC BODY AND REFRIGERATOR

CROSS-REFERENCE TO RELATED APPLICATIONS

This application is a Continuation of U.S. application Ser. No. 16/981,980(U.S. Pat. No. 11,466,926), filed Sep. 17, 2020, which is a U.S. National Stage Application under 35 U.S.C. § 371 of PCT Application No. PCT/KR2019/007758, filed Jun. 26, 2019, which claims priority to Korean Patent Application No. 10-2018-0074252, filed Jun. 27, 2018, whose entire disclosures are hereby incorporated by reference.

TECHNICAL FIELD

The present disclosure relates to a vacuum adiabatic body and a refrigerator.

BACKGROUND ART

A vacuum adiabatic body is a product to suppress heat transfer by having a vacuum formed in an interior of a body thereof. The vacuum adiabatic body may reduce heat transfer by convection and conduction, and hence is applied to heating apparatuses and refrigerating apparatuses. In a typical adiabatic method applied to a refrigerator, although it is differently applied in refrigeration and freezing, a foam urethane adiabatic wall having a thickness of about 30 cm or more is generally provided. However, the internal volume of the refrigerator may be reduced.

In order to increase the internal volume of a refrigerator, there is an attempt to apply a vacuum adiabatic body to the refrigerator.

First, Korean Patent No. 10-0343719 (Cited Document 1) of the present applicant has been disclosed. According to Reference Document 1, there is disclosed a method in which a vacuum adiabatic panel is prepared and then built in walls of a refrigerator, and the exterior of the vacuum adiabatic panel is finished with a separate molding such as Styrofoam. According to the method, additional foaming is not required, and the adiabatic performance of the refrigerator is improved. However, fabrication cost is increased, and a fabrication method is complicated. As another example, a technique of providing walls using a vacuum adiabatic material and additionally providing adiabatic walls using a foam filling material has been disclosed in Korean Patent Publication No. 10-2015-0012712 (Cited Document 2). According to Reference Document 2, fabrication cost is increased, and a fabrication method is complicated.

As further another example, there is an attempt to fabricate all walls of a refrigerator using a vacuum adiabatic body that is a single product. For example, a technique of providing an adiabatic structure of a refrigerator to be in a vacuum state has been disclosed in U.S. Patent Laid-Open Publication No. US 2004/0226956 A1 (Cited Document 3). However, it is difficult to obtain a practical adiabatic effect by providing a wall of the refrigerator with a sufficient vacuum. It may be difficult to prevent a heat transfer phenomenon at a contact portion between an outer case and an inner case having different temperatures, to maintain a stable vacuum state, and to prevent deformation of a case due to a negative pressure of the vacuum state. Due to these limitations, the technology disclosed in Reference Document 3 is limited to a cryogenic refrigerator, and does not provide a level of technology applicable to general households.

The present applicant had filed Patent Application No. 10-2015-0109727 in consideration of the above-described limitations. In the above document, a refrigerator including a vacuum adiabatic body is proposed. Particularly, a resin material that is adequate for a material for forming a supporting unit of the vacuum adiabatic body is proposed.

Even in this document, there is a limitation that the shape of the supporting unit is different from that of the design, it is difficult to manufacture and handle the supporting unit, the yield of the product is low, the assembling work is difficult, and an amount of resin used is large to increase in outgassing.

DISCLOSURE

Technical Problem

Embodiments provide a vacuum adiabatic body in which an amount of outgassing within a vacuum space part is reduced.

Embodiments also provide a vacuum adiabatic body in which heat transfer is minimized through a supporting unit.

Embodiments also provide a vacuum adiabatic body in which an internal configuration of a vacuum space part is optimized to improve convenience in manufacturing.

Technical Solution

In one embodiment, a vacuum adiabatic body includes a supporting unit configured to maintain a vacuum space part. The supporting unit includes a support plate supported on an inner surface of one of a first plate member and a second plate member and a bar extending from the support plate, the bar point-contacting an inner surface of the other of the first plate member and the second plate member. The other end of the plate member-side bar has a cross-section less than that of one end of the support plate-side bar. Thus, a heat transfer amount may be reduced.

Since the inside of the bar is empty, an occurrence of outgassing and thermal conductivity may be further reduced.

In another embodiment, a refrigerator includes a main body configured to provide an internal space in which goods or items are stored and a door provided to open and close the main body from an external space. At least one of the door or the main body includes a vacuum adiabatic body. The vacuum adiabatic body includes a supporting unit configured to maintain a vacuum space part within the vacuum adiabatic body. The supporting unit includes a support plate supported on an inner surface of the second plate member and a bar extending from the support plate, the bar directly contacting the first plate member. Thus, thermal conductivity may be reduced to further reduce outgassing.

In another embodiment, a vacuum adiabatic body includes a supporting unit configured to maintain a vacuum space. The supporting unit includes a support plate supported on an inner surface of one of the first plate member and the second plate member and a bar extending from the support plate, the bar contacting an inner surface of the other of the first plate member and the second plate member. Thus, an amount of resin used in the supporting unit may be further reduced to reduce costs, reducing outgassing, reducing a weight, reducing a heat transfer amount, simplifying a structure, and improving convenience of assembly.

Advantageous Effects

According to the embodiments, since the amount of the resin used in the vacuum space part is reduced, the amount of outgassing inside the vacuum space part may be reduced, and the service life of the product may be prolonged even when used for a long period of time.

According to the embodiments, the contact points of the supporting unit for transferring heat to the inner and outer plate members may be reduced to improve the sectional structure, thereby minimizing the thermal conductivity through the supporting unit and improving the heat adiabatic function of the vacuum adiabatic body.

According to the embodiments, the radiation resistance sheets may be coupled to each other and are supported by the supporting unit together with the coupling to facilitate the integration of the structures in the vacuum space part and reduce the labor of the operator.

DESCRIPTION OF DRAWINGS

FIG. 4 is a diagram illustrating results obtained by examining resins.

FIGS. 15 and 16 are views illustrating two types of radiation resistance sheets different from each other, wherein FIG. 15 is a view of a first radiation resistance sheet applied to a bottom surface, and FIG. 16 is a plan view of a second radiation resistance sheet applied to a side surface.

MODE FOR INVENTION

Hereinafter, exemplary embodiments will be described with reference to the accompanying drawings. The invention may, however, be embodied in many different forms and should not be construed as being limited to the embodiments set forth herein, and a person of ordinary skill in the art, who understands the spirit of the present invention, may readily implement other embodiments included within the scope of the same concept by adding, changing, deleting, and adding components; rather, it will be understood that they are also included within the scope of the present invention.

The drawings shown below may be displayed differently from the actual product, or exaggerated or simple or detailed parts may be deleted, but this is intended to facilitate understanding of the technical idea of the present invention. It should not be construed as limited.

In the following description, the vacuum pressure means any pressure state lower than the atmospheric pressure. In addition, the expression that a vacuum degree of A is higher than that of B means that a vacuum pressure of A is lower than that of B.

Figure 1:
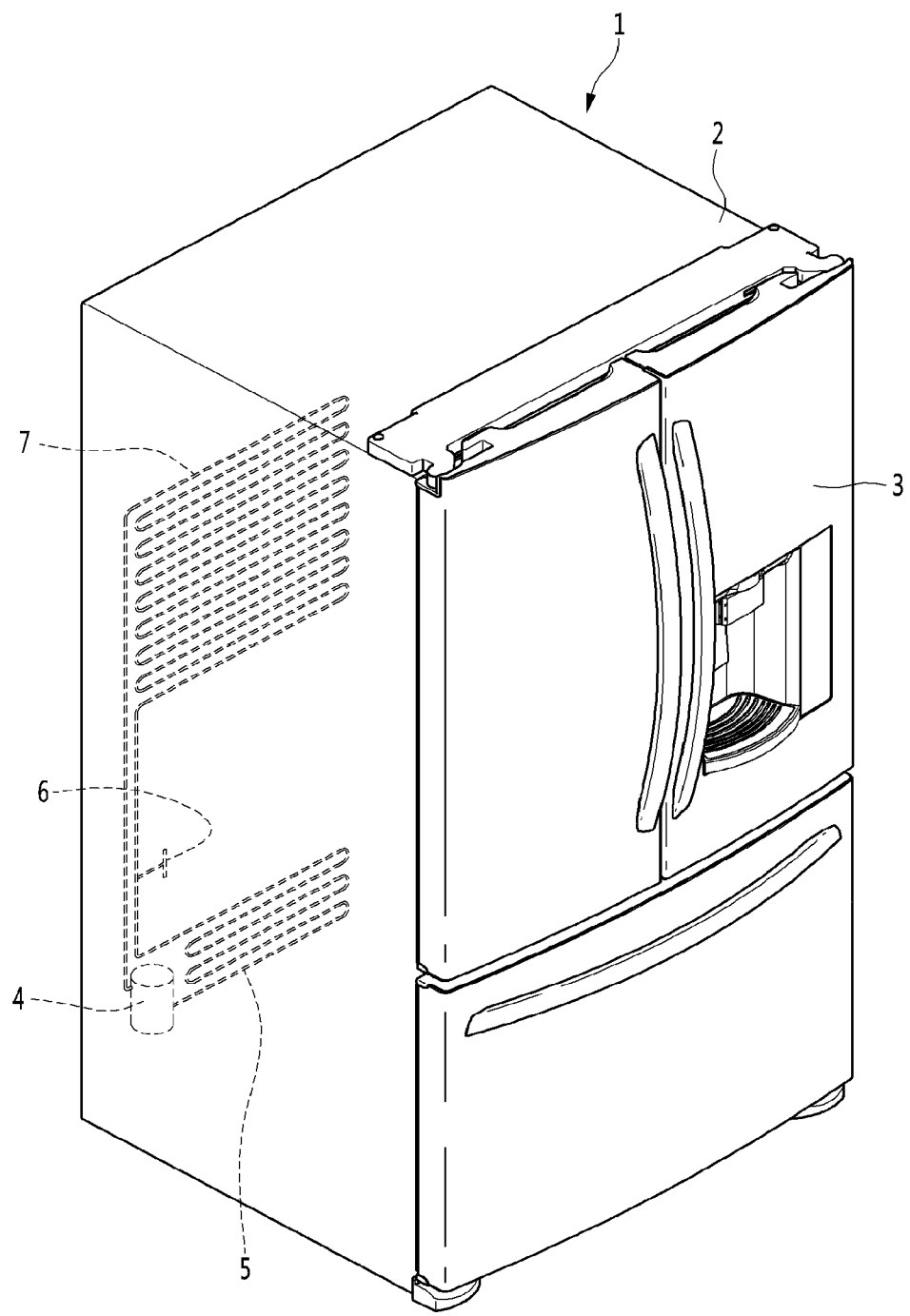
FIG. 1 is a perspective view of a refrigerator according to an embodiment.

FIG. 1 is a perspective view of a refrigerator according to an embodiment.

Referring to FIG. 1, the refrigerator 1 may include a main body 2 provided with a cavity 9 capable of storing storage goods and a door 3 provided to open or close the main body 2. The door 3 may be rotatably or slidably movably provided to open or close the cavity 9. The cavity 9 may provide at least one of a refrigerating compartment and a freezing compartment.

The cavity 9 may be supplied with parts or devices of a refrigeration or a freezing cycle in which cold air is supplied into the cavity 9. For example, the parts may include a compressor 4 to compress a refrigerant, a condenser 5 to condense the compressed refrigerant, an expander 6 to expand the condensed refrigerant, and an evaporator 7 to evaporate the expanded refrigerant to take heat. As a typical structure, a fan may be installed at a position adjacent to the evaporator 7, and a fluid blown from the fan may pass through the evaporator 7 and then be blown into the cavity 9. A freezing load is controlled by adjusting the blowing amount and blowing direction by the fan, adjusting the amount of a circulated refrigerant, or adjusting the compression rate of the compressor, so that it is possible to control a refrigerating space or a freezing space.

Other parts constituting the refrigeration cycle may be constituted by applying a member including a thermoelectric module.

Figure 2:
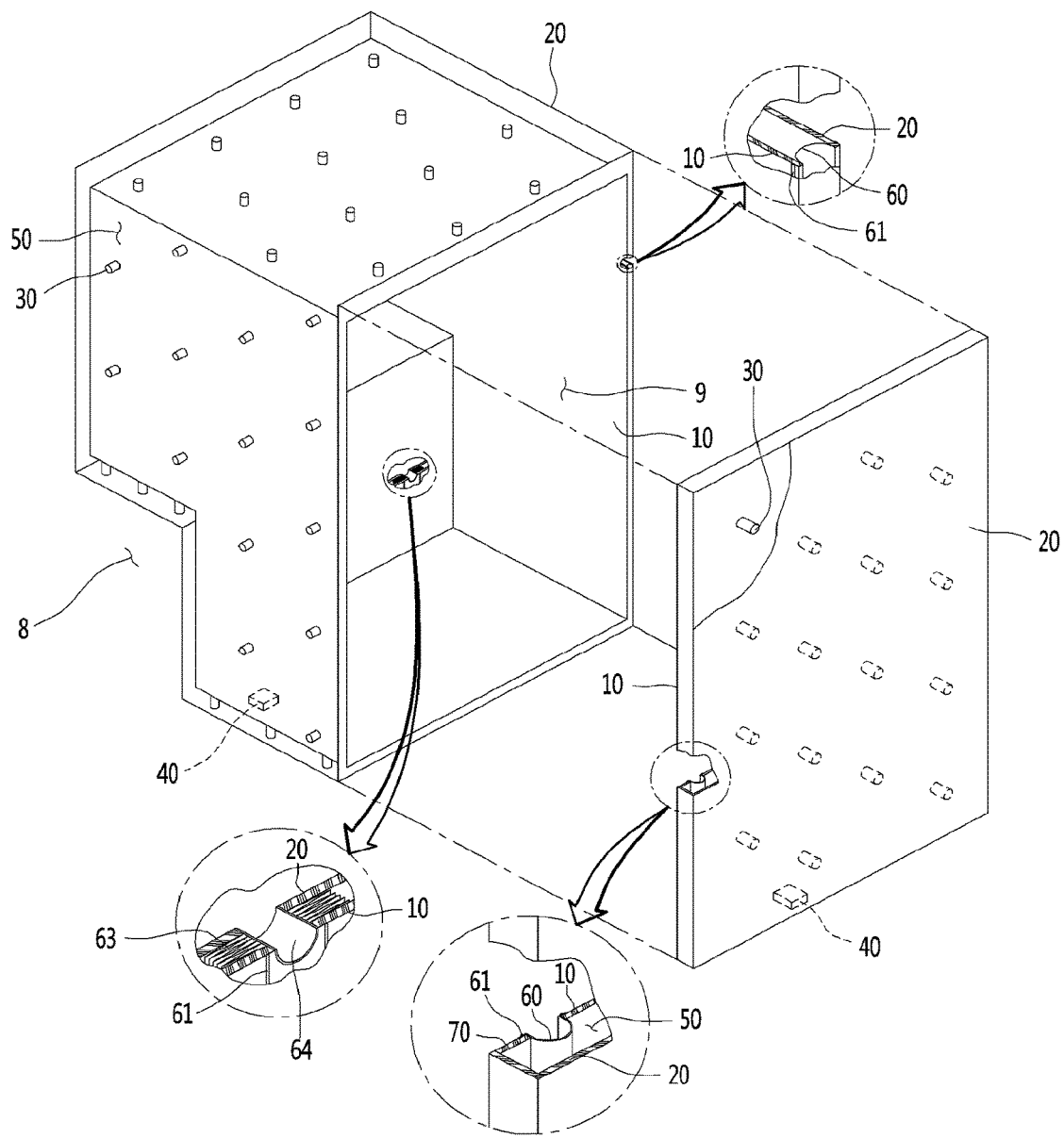
FIG. 2 is a view schematically showing a vacuum adiabatic body used in a main body and a door of the refrigerator.

FIG. 2 is a view schematically showing a vacuum adiabatic body used in the main body 2 and the door 3 of the refrigerator 1. In FIG. 2, a main body-side vacuum adiabatic body is illustrated in a state in which top and side walls are removed, and a door-side vacuum adiabatic body is illustrated in a state in which a portion of a front wall is removed. In addition, sections of portions at conductive resistance sheets 60 or 63 are provided are schematically illustrated for convenience of understanding.

Referring to FIG. 2, the vacuum adiabatic body may include a first plate member 10 to provide a wall of a low-temperature space or a first space, a second plate member 20 to provide a wall of a high-temperature space or a second space, and a vacuum space part or a third space 50 defined as a gap between the first and second plate members 10 and 20. Also, the vacuum adiabatic body includes the conductive resistance sheets 60 and 63 to prevent heat conduction between the first and second plate members 10 and 20. A sealing or welding part 61 may seal the conductive resistance sheets 60 and 63 to the first and second plate members 10 and 20 such that the vacuum space part 50 is in a sealed or vacuum state.

When the vacuum adiabatic body is applied to a refrigerator or a warming apparatus, the first plate member 10 providing a wall of an internal or inner space of the refrigerator may be referred to as an inner case, and the second plate member 20 providing a wall of an outer space of the refrigerator may be referred to as an outer case.

A machine room 8 may include parts providing a refrigerating or a freezing cycle. The machine room may be placed at a lower rear side of the main body-side vacuum adiabatic body, and an exhaust port 40 to form a vacuum state by exhausting air from the vacuum space part 50 is provided at any one side of the vacuum adiabatic body. In addition, a pipeline 64 passing through the vacuum space part 50 may be further installed so as to install a defrosting water line and electric lines.

The first plate member 10 may define at least one portion of a wall for a first space provided thereto. The second plate member 20 may define at least one portion of a wall for a second space provided thereto. The first space and the second space may be defined as spaces having different temperatures. Here, the wall for each space may serve as not only a wall directly contacting the space but also a wall not contacting the space. For example, the vacuum adiabatic body or insulator of the embodiment may also be applied to a product further having a separate wall contacting each space.

Factors of heat transfer, which cause loss of the adiabatic effect of the vacuum adiabatic body, are thermal or heat conduction between the first and second plate members 10 and 20, heat radiation between the first and second plate members 10 and 20, and gas conduction of the vacuum space part 50.

Hereinafter, a heat resistance unit or sheet provided to reduce adiabatic loss related to the factors of the heat transfer will be provided. The vacuum adiabatic body and the refrigerator of the embodiment do not exclude that another adiabatic means is further provided to at least one side of the vacuum adiabatic body. Therefore, an adiabatic means using foaming or the like may be further provided to another side of the vacuum adiabatic body.

The heat resistance unit may include a conductive resistance sheet 60 or 63 that resists conduction of heat transferred along a wall of a third space 50 and may further include a side frame coupled to the conductive resistance sheet. The conductive resistance sheet 60 or 63 and the side frame will be clarified by the following description.

Also, the heat resistance unit may include at least one radiation resistance sheet 32 that is provided in a plate shape within the third space 50 or may include a porous material that resists radiation heat transfer between the second plate member 20 and the first plate member 10 within the third space 50. The radiation resistance sheet 32 and the porous material will be clarified by the following description.

Figure 3A:
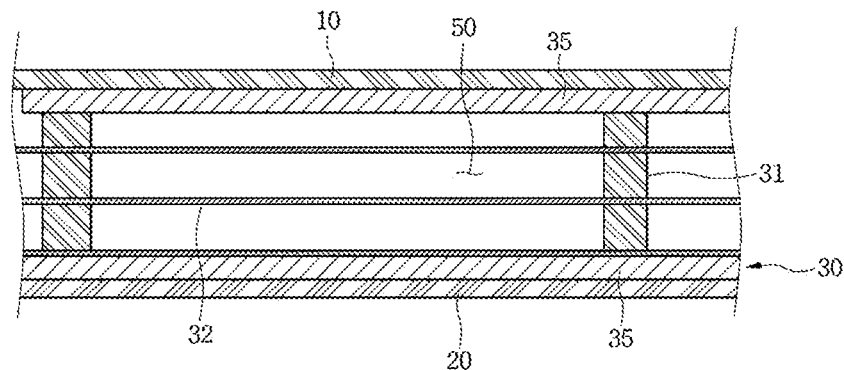
FIGS. 3A-3C are views illustrating various embodiments of an internal configuration of a vacuum space part.
Figure 3B:
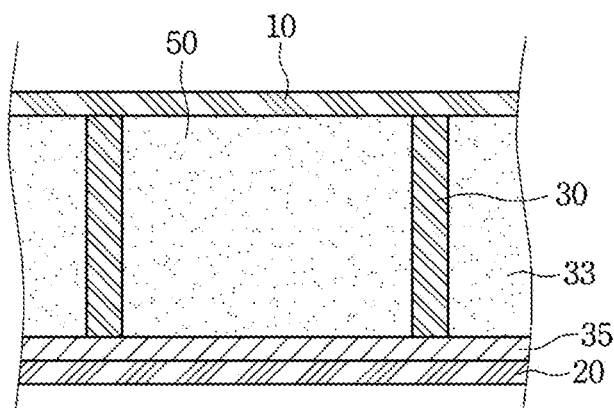
Figure 3C:
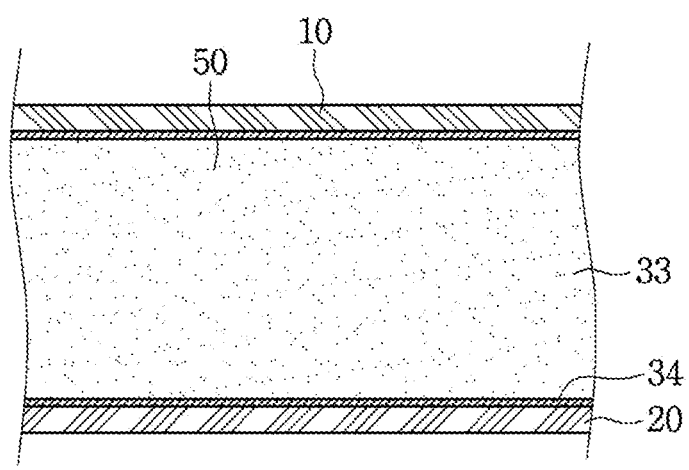

FIGS. 3A-3C are views illustrating various embodiments of an internal configuration of the vacuum space part or third space 50.

First, referring to FIG. 3A, the vacuum space part 50 may have a pressure different from that of each of the first and second spaces, preferably, a vacuum state, thereby reducing an adiabatic loss. The vacuum space part 50 may be provided at a temperature between the temperature of the first space and the temperature of the second space. Since the vacuum space part 50 is provided as a space in the vacuum state, the first and second plate members 10 and 20 receive a force contracting in a direction in which they approach each other due to a force corresponding to a pressure difference between the first and second spaces. Therefore, the vacuum space part 50 may be deformed in a direction in which it is reduced. In this case, the adiabatic loss may be caused due to an increase in amount of heat radiation, caused by the contraction of the vacuum space part 50, and an increase in amount of thermal or heat conduction, caused by contact between the plate members 10 and 20.

The supporting unit or support 30 may be provided to reduce deformation of the vacuum space part 50. The supporting unit 30 includes a bar 31. The bar 31 may extend in a substantially vertical direction with respect to the plate members 10 and 20 to support a distance between the first plate member 10 and the second plate member 20. A support plate 35 may be additionally provided on at least any one end of the bar 31. The support plate 35 may connect at least two or more bars 31 to each other to extend in a horizontal direction with respect to the first and second plate members 10 and 20. The support plate 35 may be provided in a plate shape or may be provided in a lattice shape so that an area of the support plate contacting the first or second plate member 10 or 20 decreases, thereby reducing heat transfer. The bars 31 and the support plate 35 are fixed to each other at at least one portion, to be inserted together between the first and second plate members 10 and 20. The support plate 35 contacts at least one of the first and second plate members 10 and 20, thereby preventing deformation of the first and second plate members 10 and 20. In addition, based on the extending direction of the bars 31, a total sectional area of the support plate 35 is provided to be greater than that of the bars 31, so that heat transferred through the bars 31 may be diffused through the support plate 35.

A material of the supporting unit 30 will be described.

The supporting unit 30 may have a high compressive strength so as to endure the vacuum pressure, a low outgassing rate and a low water absorption rate so as to maintain the vacuum state, a low thermal conductivity so as to reduce the thermal or heat conduction between the plate members 10 and 20. Also, the supporting unit 30 may have a secure compressive strength at a high temperature so as to endure a high-temperature exhaust process, have an excellent machinability so as to be subjected to molding, and have a low cost for molding. Here, the time required to perform the exhaust process takes about a few days. Hence, the time is reduced, thereby considerably improving fabrication cost and productivity. Therefore, the compressive strength is to be secured at the high temperature because an exhaust speed is increased as a temperature at which the exhaust process is performed becomes higher. The inventor has performed various examinations under the above-described conditions.

First, ceramic or glass has a low outgassing rate and a low water absorption rate, but its machinability is remarkably lowered. Hence, ceramic and glass may not be used as the material of the supporting unit 30. Resin may be considered as the material of the supporting unit 30.

FIG. 4 is a diagram illustrating results obtained by examining resins.

Referring to FIG. 4, the present inventor has examined various resins, and most of the resins may not be used because their outgassing rates and water absorption rates are remarkably high. Accordingly, the present inventor has examined resins that approximately satisfy conditions of the outgassing rate and the water absorption rate. As a result, polyethylene (PE) may not be used due to its high outgassing rate and its low compressive strength. Polychlorotrifluoroethylene (PCTFE) may not be used due to its remarkably high price. Polyether ether ketone PEEK may not be used due to its high outgassing rate. A resin selected from the group consisting of polycarbonate (PC), glass fiber PC, low outgassing PC, polyphenylene sulfide (PPS), and liquid crystal polymer (LCP) may be used as the material of the supporting unit 30. However, an outgassing rate of PC is 0.19, which is at a low level. Hence, as the time required to perform baking in which exhaustion is performed by applying heat is increased to a certain level, PC may be used as the material of the supporting unit 30.

The present inventor has found an optimal material by performing various studies on resins expected to be used inside the vacuum space part 50. Hereinafter, results of the performed studies will be described with reference to the accompanying drawings.

Figure 5:
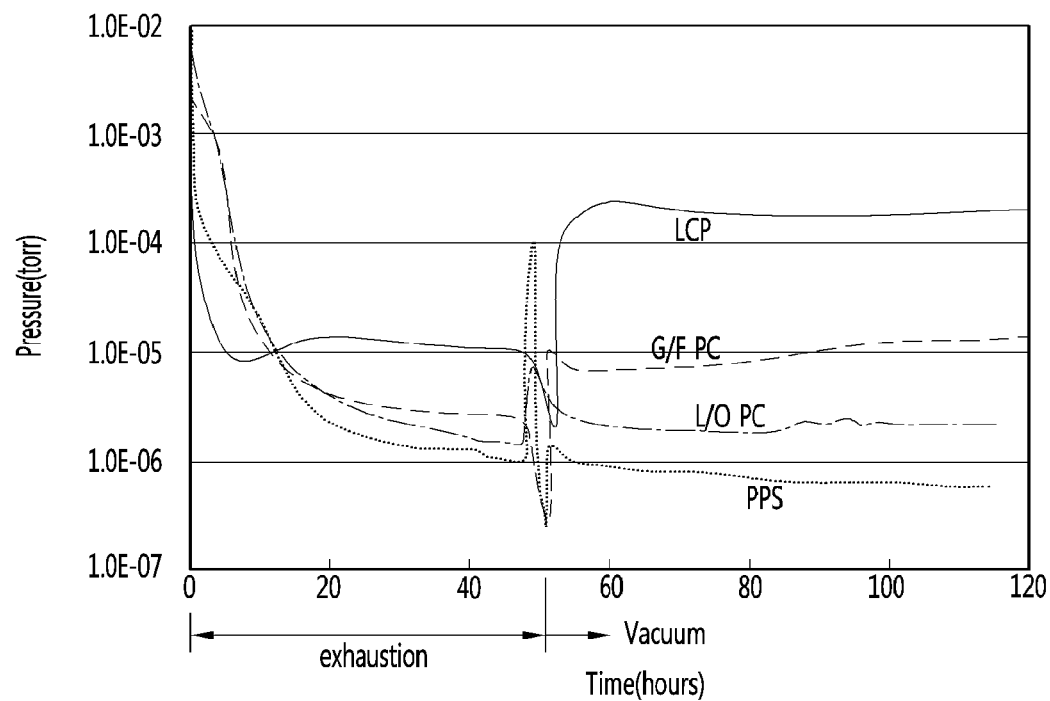
FIG. 5 illustrates results obtained by performing an experiment on vacuum maintenance performances of resins.

FIG. 5 is a view illustrating results obtained by performing an experiment on vacuum maintenance performances of the resins.

Referring to FIG. 5, there is illustrated a graph showing results obtained by fabricating the supporting unit 30 using the respective resins and then testing vacuum maintenance performances of the resins. First, a supporting unit 30 fabricated using a selected material was cleaned using ethanol, left at a low pressure for 48 hours, exposed to the air for 2.5 hours, and then subjected to an exhaust process at 90° C. for about 50 hours in a state where the supporting unit 30 was put in the vacuum adiabatic body, thereby measuring a vacuum maintenance performance of the supporting unit 30.

An initial exhaust performance of LCP is best, but its vacuum maintenance performance is bad. This may be caused by sensitivity of the LCP to temperature. Also, it is expected through characteristics of the graph that, when a final allowable pressure is $5 \times 10^{-3}$ Torr, its vacuum performance will be maintained for a time of about 0.5 years. Therefore, the LCP may not be used as the material of the supporting unit 30.

Regarding glass fiber PC (G/F PC), its exhaust speed is fast, but its vacuum maintenance performance is low. It is determined that this will be influenced by an additive. Also, it is expected through the characteristics of the graph that the glass fiber PC will maintain its vacuum performance under the same conditions for a time of about 8.2 years. Therefore, PC (G/F PC) may not be used as the material of the supporting unit 30.

It is expected that, in the case of the low outgassing PC (O/G PC), its vacuum maintenance performance is excellent, and its vacuum performance will be maintained under the same conditions for a time of about 34 years, as compared with the above-described two materials. However, it may be seen that the initial exhaust performance of the low outgassing PC is low, and therefore, the fabrication efficiency of the low outgassing PC is lowered.

It may be seen that, in the case of the PPS, its vacuum maintenance performance is remarkably excellent, and its exhaust performance is also excellent. Based on the vacuum maintenance performance, PPS may be used as the material of the supporting unit 30.

Figure 6A:
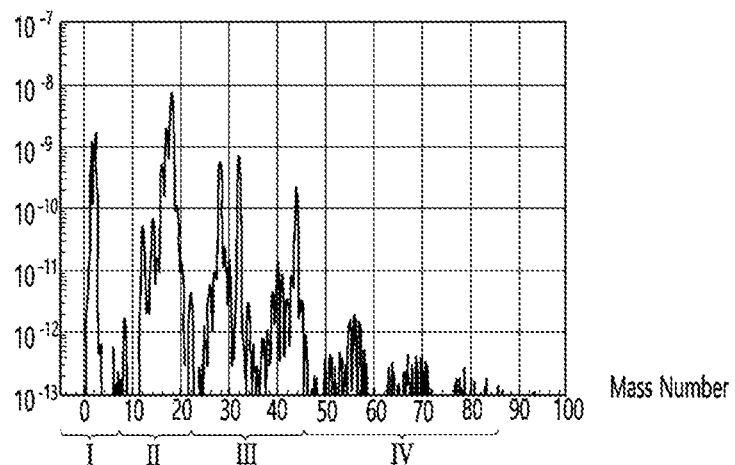
FIGS. 6A-6C illustrate results obtained by analyzing components of gases discharged from a PPS and a low outgassing PC.
Figure 6B:
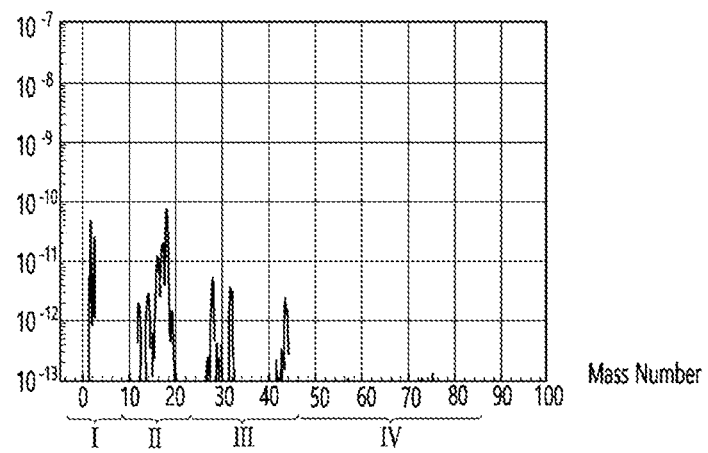
Figure 6C:
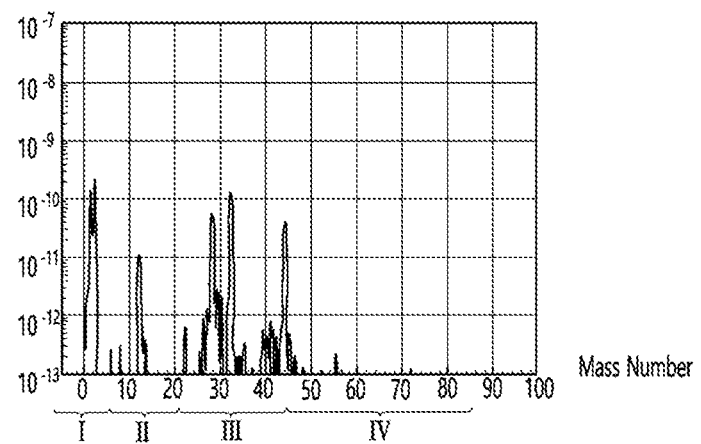

FIGS. 6A-6C illustrate results obtained by analyzing components of gases discharged from the PPS and the low outgassing PC, in which the horizontal axis represents mass numbers of gases and the vertical axis represents concentrations of gases. FIG. 6A illustrates a result obtained by analyzing a gas discharged from the low outgassing PC. In FIG. 6A, it may be seen that hydrogen or $H_2$ series (I), water or $H_2O$ series (II), dinitrogen/carbon monoxide/carbon dioxide/oxygen or $N_2/CO/CO_2/O_2$ series (III), and hydrocarbon series (IV) are equally discharged. FIG. 6B illustrates a result obtained by analyzing a gas discharged from the PPS. In FIG. 6B, it may be seen that the $H_2$ series (I), $H_2O$ series (II), and $N_2/CO/CO_2/O_2$ series (III) are discharged to a weak extent. FIG. 6C is a result obtained by analyzing a gas discharged from stainless steel. In FIG. 6C, it may be seen that a similar gas to the PPS is discharged from the stainless steel. Consequently, it may be seen that the PPS discharges a similar gas to the stainless steel.

As the analyzed result, it may be re-confirmed that the PPS is excellent as the material of the supporting unit 30.

Figure 7:
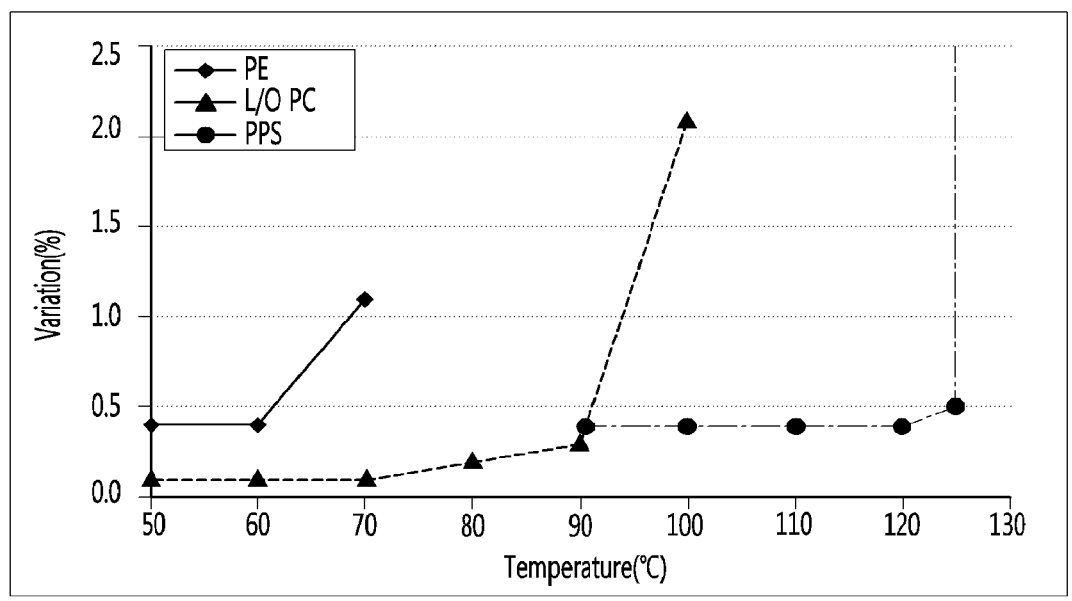
FIG. 7 illustrates results obtained by measuring maximum deformation temperatures at which resins are damaged by atmospheric pressure in high-temperature exhaustion.

FIG. 7 illustrates results obtained by measuring maximum deformation temperatures at which resins are damaged by atmospheric pressure in high-temperature exhaustion. At this time, the bars 31 were provided at a diameter of 2 mm at a distance of 30 mm. Referring to FIG. 7, it may be seen that a rupture occurs at 60° C. in the case of the PE, a rupture occurs at 90° C. in the case of the low outgassing PC, and a rupture occurs at 125° C. in the case of the PPS.

As the analyzed result, it may be seen that the PPS may be used as the resin used inside the vacuum space part 50. However, the low outgassing PC may be used in terms of fabrication cost.

Referring back to FIG. 3A, a radiation resistance sheet 32 to reduce heat radiation between the first and second plate members 10 and 20 through the vacuum space part 50 will be described. The first and second plate members 10 and 20 may be made of a stainless material capable of preventing corrosion and providing a sufficient strength. The stainless material has a relatively high emissivity of 0.16, and hence a large amount of radiation heat may be transferred. In addition, the supporting unit 30 made of the resin has a lower emissivity than the plate members, and is not entirely provided to inner surfaces of the first and second plate members 10 and 20. Hence, the supporting unit 30 does not have great influence on radiation heat. Therefore, the radiation resistance sheet 32 may be provided in a plate shape over a majority of the area of the vacuum space part 50 so as to concentrate on reduction of radiation heat transferred between the first and second plate members 10 and 20. A product having a low emissivity may be used as the material of the radiation resistance sheet 32. In an embodiment, an aluminum foil having an emissivity of 0.02 may be used as the radiation resistance sheet 32. Also, since the transfer of radiation heat may not be sufficiently blocked using one radiation resistance sheet 32, at least two radiation resistance sheets 32 may be provided at a certain distance so as not to contact each other. Also, at least one radiation resistance sheet 32 may be provided in a state in which it contacts the inner surface of the first or second plate member 10 or 20.

Referring to FIG. 3B, the distance between the plate members 10 and 20 is maintained by the supporting unit 30, and a porous material 33 may be filled in the vacuum space part 50. The porous material 33 may have a higher emissivity than the stainless material of the first and second plate members 10 and 20. However, since the porous material 33 is filled in the vacuum space part 50, the porous material 33 has a high efficiency for resisting the radiation heat transfer.

In the present embodiment, the vacuum adiabatic body may be manufactured without the radiation resistance sheet 32.

Referring to FIG. 3C the supporting unit 30 to maintain the vacuum space part 50 may not be provided. A porous material 333 may be provided to be surrounded by a film 34 instead of the supporting unit 30. Here, the porous material 33 may be provided in a state of being compressed so that the gap of the vacuum space part 50 is maintained. The film 34 made of, for example, a PE material provided in a state in which a hole is punched in the film 34.

In the present embodiment, the vacuum adiabatic body may be manufactured without the supporting unit 30. That is to say, the porous material 33 may perform the function of the radiation resistance sheet 32 and the function of the supporting unit 30 together.

Figure 8A:
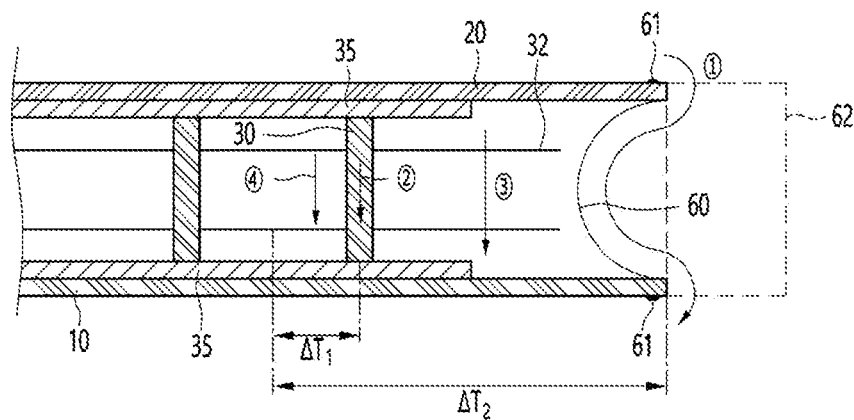
FIGS. 8A-8C are views showing various embodiments of conductive resistance sheets and peripheral parts thereof.
Figure 8B:
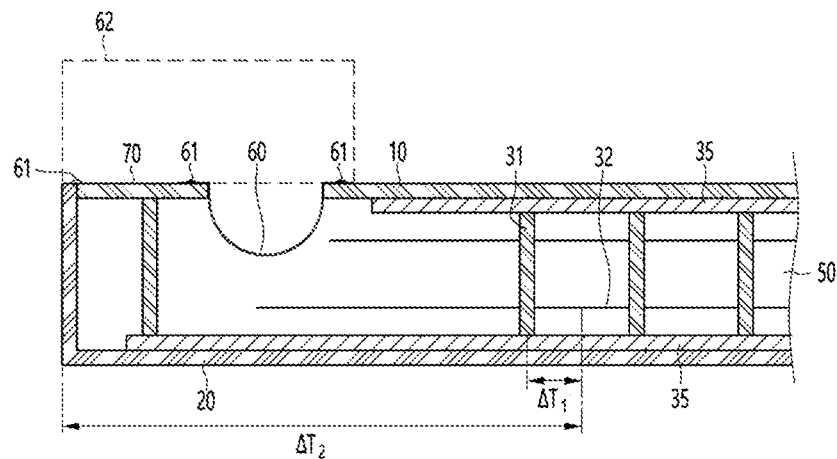
Figure 8C:
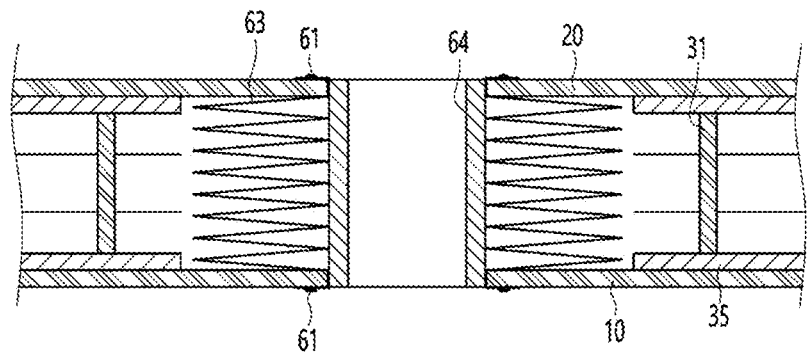

FIGS. 8A-8C are views showing various embodiments of conductive resistance sheets 60 or 63 and peripheral parts thereof. Structures of the conductive resistance sheets 60 or 63 are briefly illustrated in FIG. 2, but will be understood in detail with reference to the drawings.

First, a conductive resistance sheet 60 proposed in FIG. 8A may be applied to the main body-side vacuum adiabatic body. Specifically, the first and second plate members 10 and 20 may be sealed so as to vacuumize the interior of the vacuum adiabatic body. In this case, since the first and second plate members 10 and 20 have different temperatures from each other, heat transfer may occur between the first and second plate members 10 and 20. A conductive resistance sheet 60 is provided to prevent thermal or heat conduction between two different kinds of plate members 10 and 20.

The conductive resistance sheet 60 may be provided with sealing or welding parts 61 at which both ends of the conductive resistance sheet 60 are sealed to define at least one portion of the wall for the third space or vacuum space part 50 and maintain the vacuum state. The conductive resistance sheet 60 may be provided as a thin foil in unit of micrometer so as to reduce the amount of heat conducted along the wall for the vacuum space part 50. The sealing parts 61 may be provided as welding parts, and the conductive resistance sheet 60 and the plate members 10 and 20 may be fused to each other. In order to cause a fusing action between the conductive resistance sheet 60 and the first and second plate members 10 and 20, the conductive resistance sheet 60 and the first and second plate members 10 and 20 may be made of the same material (e.g., a stainless material). The sealing parts 61 are not limited to the welding parts, and may be provided through a process such as cocking. The conductive resistance sheet 60 may be provided in a curved shape. Thus, a thermal conduction distance of the conductive resistance sheet 60 is provided longer than the linear distance of each plate member 10 and 20, so that the amount of thermal conduction may be further reduced.

A change in temperature occurs along the conductive resistance sheet 60. Therefore, in order to block heat transfer to the exterior of the conductive resistance sheet 60, a shielding part or cover 62 may be provided at the exterior of the conductive resistance sheet 60 such that an adiabatic action occurs. In other words, in the refrigerator 1, the second plate member 20 has a high temperature and the first plate member 10 has a low temperature. In addition, thermal conduction from high temperature to low temperature occurs in the conductive resistance sheet 60, and hence the temperature of the conductive resistance sheet 60 is suddenly changed. Therefore, when the conductive resistance sheet 60 is opened to the exterior thereof, heat transfer through the opened place may seriously occur. In order to reduce heat loss, the shielding part 62 is provided at the exterior of the conductive resistance sheet 60. For example, when the conductive resistance sheet 60 is exposed to any one of the low-temperature space and the high-temperature space, the conductive resistance sheet 60 may not serve as a conductive resistor at the exposed portion.

The shielding part 62 may be provided as a porous material contacting an outer surface of the conductive resistance sheet 60. The shielding part 62 may be provided as an adiabatic structure, e.g., a separate gasket, which is placed at the exterior of the conductive resistance sheet 60. The shielding part 62 may be provided as a portion of the vacuum adiabatic body, which is provided at a position facing a corresponding conductive resistance sheet 60 when the main body-side vacuum adiabatic body is closed with respect to the door-side vacuum adiabatic body. In order to reduce heat loss even when the main body 2 and the door 3 are opened, the shielding part 62 may be provided as a porous material or a separate adiabatic structure.

A conductive resistance sheet 60 proposed in FIG. 8B may be applied to the door-side vacuum adiabatic body. In FIG. 8B, portions different from those of FIG. 8A are described in detail, and the same description is applied to portions identical to those of FIG. 8A. A side frame 70 is further provided at an outside of the conductive resistance sheet 60. A part or seal to seal between the door 3 and the main body 2, an exhaust port necessary for an exhaust process, a getter port for vacuum maintenance, and the like may be placed on the side frame 70. This is because the mounting of parts is convenient in the main body-side vacuum adiabatic body, but the mounting positions of parts are limited in the door-side vacuum adiabatic body.

In the door-side vacuum adiabatic body, it is difficult to place the conductive resistance sheet 60 at a front end portion of the vacuum space part 50, i.e., a corner side portion of the vacuum space part 50. This is because, unlike the main body 2, a corner edge portion of the door 3 is exposed to the exterior. In more detail, if the conductive resistance sheet 60 is placed at the front end portion of the vacuum space part 50, the corner edge portion of the door 3 is exposed to the exterior, and hence there is a disadvantage in that a separate adiabatic part should be configured so as to heat-insulate the conductive resistance sheet 60.

A conductive resistance sheet 63 proposed in FIG. 8C may be installed in the pipeline 64 passing through the vacuum space part 50. In FIG. 8C, portions different from those of FIGS. 8A and 8b are described in detail, and the same description is applied to portions identical to those of FIGS. 8A and 8B. A conductive resistance sheet 63 having a similar shape as that of FIG. 8A, such as a wrinkled or zig-zag conductive resistance sheet 63, may be provided at a peripheral portion of the pipeline 64. Accordingly, a heat transfer path may be lengthened, and deformation caused by a pressure difference may be prevented. In addition, a separate shielding part may be provided to improve the adiabatic performance of the conductive resistance sheet.

A heat transfer path between the first and second plate members 10 and 20 will be described with reference back to FIG. 8A. Heat passing through the vacuum adiabatic body may be divided into surface conduction heat conducted along a surface of the vacuum adiabatic body, more specifically, the conductive resistance sheet 60, supporter conduction heat conducted along the supporting unit 30 provided inside the vacuum adiabatic body, gas conduction heat conducted through an internal gas in the vacuum space part, and radiation transfer heat transferred through the vacuum space part.

The transfer heat may be changed depending on various depending on various design dimensions. For example, the supporting unit 30 may be changed such that the first and second plate members 10 and 20 may endure a vacuum pressure without being deformed, the vacuum pressure may be changed, the distance between the first and second plate members 10 and 20 may be changed, and the length of the conductive resistance sheet 60 or 63 may be changed. The transfer heat may be changed depending on a difference in temperature between the spaces (the first and second spaces) respectively provided by the plate members 10 and 20. In the embodiment, a configuration of the vacuum adiabatic body has been found by considering that its total heat transfer amount is smaller than that of a typical adiabatic structure formed by foaming polyurethane. In a typical refrigerator including the adiabatic structure formed by foaming the polyurethane, an effective heat transfer coefficient may be proposed as 19.6 mW/mK.

By performing a relative analysis on heat transfer amounts of the vacuum adiabatic body of the embodiment, a heat transfer amount by the gas conduction heat ③ may become the smallest. For example, the heat transfer amount by the gas conduction heat ③ may be controlled to be equal to or smaller than 4% of the total heat transfer amount. A heat transfer amount by solid conduction heat defined as a sum of the surface conduction heat ① and the supporter conduction heat ② is the largest. For example, the heat transfer amount by the solid conduction heat may reach 75% of the total heat transfer amount. A heat transfer amount by the radiation transfer heat ③ is smaller than the heat transfer amount by the solid conduction heat but larger than the heat transfer amount of the gas conduction heat. For example, the heat transfer amount by the radiation transfer heat ③ may occupy about 20% of the total heat transfer amount.

According to such a heat transfer distribution, effective heat transfer coefficients (eK: effective K) (W/mK) of the surface conduction heat ①, the supporter conduction heat ②, the gas conduction heat ③, and the radiation transfer heat ④ may have an order of Math Equation 1.

$$eK_{solid\ conduction\ heat} > eK_{radiation\ transfer\ heat} > eK_{gas\ conduction\ heat}$$
Equation 1

Here, the effective heat transfer coefficient (eK) is a value that may be measured using a shape and temperature differences of a target product. The effective heat transfer coefficient (eK) is a value that may be obtained by measuring a total heat transfer amount and a temperature at least one portion at which heat is transferred. For example, a calorific value (W) is measured using a heating source that may be quantitatively measured in the refrigerator, a temperature distribution (K) of the door is measured using heats respectively transferred through a main body and an edge of the door of the refrigerator, and a path through which heat is transferred is calculated as a conversion value (m), thereby evaluating an effective heat transfer coefficient.

The effective heat transfer coefficient (eK) of the entire vacuum adiabatic body is a value given by k=QL/AΔT. Here, Q denotes a calorific value (W) and may be obtained using a calorific value of a heater. A denotes a sectional area (m²) of the vacuum adiabatic body, L denotes a thickness (m) of the vacuum adiabatic body, and ΔT denotes a temperature difference.

For the surface conduction heat, a conductive calorific value may be obtained through a temperature difference (ΔT) between an entrance and an exit of the conductive resistance sheet 60 or 63, a sectional area (A) of the conductive resistance sheet, a length (L) of the conductive resistance sheet 60 or 63, and a thermal conductivity (k) of the conductive resistance sheet 60 or 63 (the thermal conductivity of the conductive resistance sheet is a material property of a material and may be obtained in advance). For the supporter conduction heat, a conductive calorific value may be obtained through a temperature difference (ΔT) between an entrance and an exit of the supporting unit 30, a sectional area (A) of the supporting unit 30, a length (L) of the supporting unit 30, and a thermal conductivity (k) of the supporting unit 30. Here, the thermal conductivity of the supporting unit 30 is a material property of a material and may be obtained in advance. The sum of the gas conduction heat ③, and the radiation transfer heat ④ may be obtained by subtracting the surface conduction heat and the supporter conduction heat from the heat transfer amount of the entire vacuum adiabatic body. A ratio of the gas conduction heat ③, and the radiation transfer heat ④ may be obtained by evaluating radiation transfer heat when no gas conduction heat exists by remarkably lowering a vacuum degree of the vacuum space part 50.

When a porous material is provided inside the vacuum space part 50, porous material conduction heat ⑤ may be a sum of the supporter conduction heat ② and the radiation transfer heat ④. The porous material conduction heat may be changed depending on various variables including a kind, an amount, and the like of the porous material.

According to an embodiment, a temperature difference $\Delta T_1$ between a geometric center formed by adjacent bars 31 and a point at which each of the bars 31 is located may be preferably provided to be less than 0.5° C. Also, a temperature difference $\Delta T_2$ between the geometric center formed by the adjacent bars 31 and an edge portion of the vacuum adiabatic body may be preferably provided to be less than 0.5° C. In the second plate member 20, a temperature difference between an average temperature of the second plate member 20 and a temperature at a point at which a heat transfer path passing through the conductive resistance sheet 60 or 63 meets the second plate member 20 may be the largest. For example, when the second space is a region hotter than the first space, the temperature at the point at which the heat transfer path passing through the conductive resistance sheet 60 or 63 meets the second plate member 20 becomes lowest. Similarly, when the second space is a region colder than the first space, the temperature at the point at which the heat transfer path passing through the conductive resistance sheet 60 or 63 meets the second plate member 20 becomes highest.

This means that the amount of heat transferred through other points except the surface conduction heat passing through the conductive resistance sheet 60 or 63 should be controlled, and the entire heat transfer amount satisfying the vacuum adiabatic body may be achieved only when the surface conduction heat occupies the largest heat transfer amount. To this end, a temperature variation of the conductive resistance sheet 60 or 63 may be controlled to be larger than that of the plate members 10 and 20.

Physical characteristics of the parts constituting the vacuum adiabatic body will be described. In the vacuum adiabatic body, a force by vacuum pressure is applied to all of the parts. Therefore, a material having a strength (N/m²) of a certain level may be preferably used.

Under such conditions, the plate members 10 and 20 and the side frame 70 may be made of a material having a sufficient strength with which they are not damaged by even vacuum pressure. For example, when the number of bars 31 is decreased so as to limit the support conduction heat, deformation of the plate members 10 and 20 may occur due to the vacuum pressure, which may bad influence on the external appearance of refrigerator. The radiation resistance sheet 32 may be made of a material that has a low emissivity and may be easily subjected to thin film processing. Also, the radiation resistance sheet 32 is to ensure a strength strong enough not to be deformed by an external impact. The supporting unit 30 is provided with a strength strong enough to support the force by the vacuum pressure and endure an external impact, and is to have machinability. The conductive resistance sheet 60 may be made of a material that has a thin plate shape and may endure the vacuum pressure.

In an embodiment, the plate members 10 and 20, the side frame 70, and the conductive resistance sheet 60 or 63 may be made of stainless materials having the same strength. The radiation resistance sheet 32 may be made of aluminum having a weaker strength that the stainless materials. The supporting unit 30 may be made of resin having a weaker strength than the aluminum.

Unlike the strength from the point of view of materials, analysis from the point of view of stiffness is required. The stiffness (N/m) is a property that would not be easily deformed. Although the same material is used, its stiffness may be changed depending on its shape. The conductive resistance sheets 60 or 63 may be made of a material having a high or predetermined strength, but the stiffness of the material may be low so as to increase heat resistance and minimize radiation heat as the conductive resistance sheet 60 or 63 is uniformly spread without any roughness when the vacuum pressure is applied. The radiation resistance sheet 32 requires a stiffness of a certain level so as not to contact another part due to deformation. Particularly, an edge portion of the radiation resistance sheet 32 may generate conduction heat due to drooping caused by the self-load of the radiation resistance sheet 32. Therefore, a stiffness of a certain level is required. The supporting unit 30 may require a stiffness strong enough to endure a compressive stress from the plate members 10 and 20 and an external impact.

In an embodiment, the plate members 10 and 20 and the side frame 70 may have the highest stiffness so as to prevent deformation caused by the vacuum pressure. The supporting unit 30, particularly, the bar 31 may have the second highest stiffness. The radiation resistance sheet 32 may have a stiffness that is lower than that of the supporting unit 30 but higher than that of the conductive resistance sheet 60 or 63. Lastly, the conductive resistance sheet 60 or 63 may be made of a material that is easily deformed by the vacuum pressure and has the lowest stiffness.

Even when the porous material 33 is filled in the vacuum space part 50, the conductive resistance sheet 60 or 63 may have the lowest stiffness, and the plate members 10 and 20 and the side frame 70 may have the highest stiffness.

The vacuum space part 50 may resist heat transfer by only the supporting unit 30. Here, a porous material 33 may be filled with the supporting unit 30 inside the vacuum space part 50 to resist to the heat transfer. The heat transfer to the porous material 33 may resist without applying the supporting unit 30.

In the above description, as a material suitable for the supporting unit 30, a resin of PPS has been proposed. The bar 31 is provided on the support plate 35 at gaps of 2 cm to 3 cm, and the bar 31 has a height of 1 cm to 2 cm. These resins often have poor fluidity of the resin during the molding. In many cases, the molded article does not have the designed value. Particularly, the shape of a molded product such as a bar 31 having a short length is often not provided properly due to non-uniform injection of resin into a part far from the liquid injection port of the liquid.

This may cause damage of the supporting unit 30 or a defective vacuum adiabatic body later.

The supporting unit 30 may be a substantially two-dimensional structure, but its area is considerably large. Therefore, if a defect occurs in one of the portions, it is difficult to discard the entire structure. This limitation becomes even more pronounced as refrigerators and warming apparatus are becoming larger in size to meet the needs of consumers.

Hereinafter, a vacuum pressure of the vacuum adiabatic body will be described.

Figure 9:
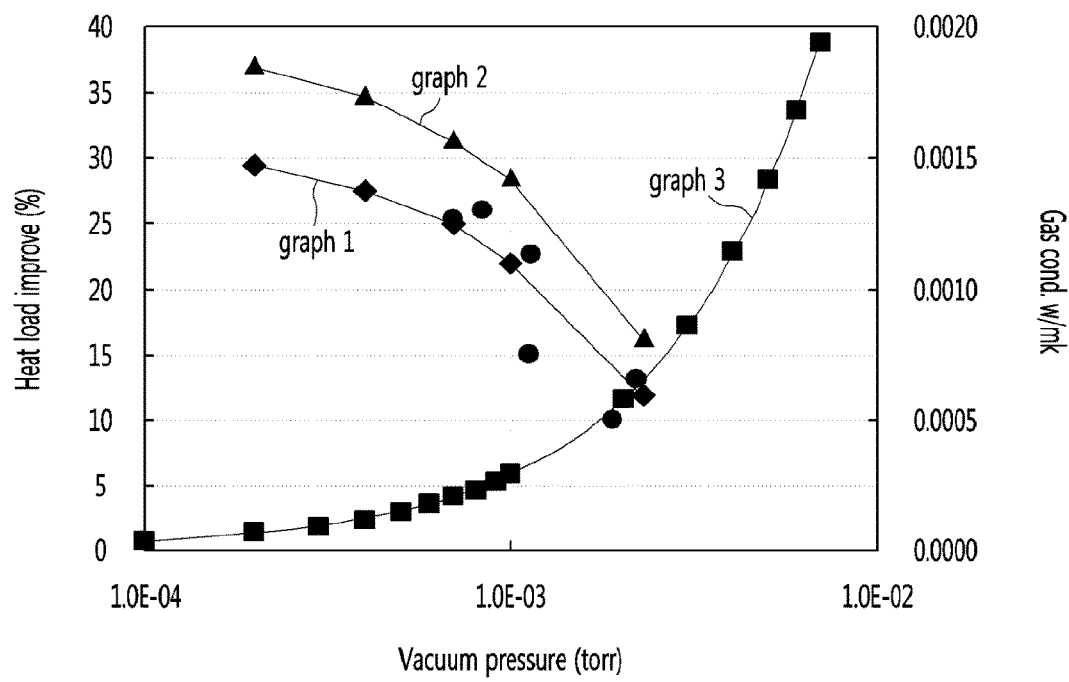
FIG. 9 is a graph illustrating a variation in adiabatic performance and a variation in gas conductivity according to a vacuum pressure by applying a simulation.

FIG. 9 illustrates graphs showing changes in adiabatic performance and changes in gas conductivity with respect to vacuum pressures by applying a simulation.

Referring to FIG. 9, it may be seen that, as the vacuum pressure is decreased, i.e., as the vacuum degree is increased, a heat load in the case of only the main body (Graph 1) or in the case where the main body 2 and the door 3 are joined together (Graph 2) is decreased as compared with that in the case of the typical product formed by foaming polyurethane, thereby improving the adiabatic performance. However, it may be seen that the degree of improvement of the adiabatic performance is gradually lowered. Also, it may be seen that, as the vacuum pressure is decreased, the gas conductivity (Graph 3) is decreased. However, it may be seen that, although the vacuum pressure is decreased, the ratio at which the adiabatic performance and the gas conductivity are improved is gradually lowered. Therefore, the vacuum pressure may be greatly reduced or reduced as low as possible. However, it takes a long time to obtain excessive vacuum pressure, and much cost is consumed due to excessive use of a getter. In the embodiment, an optimal vacuum pressure is proposed from the above-described point of view.

Figure 10:
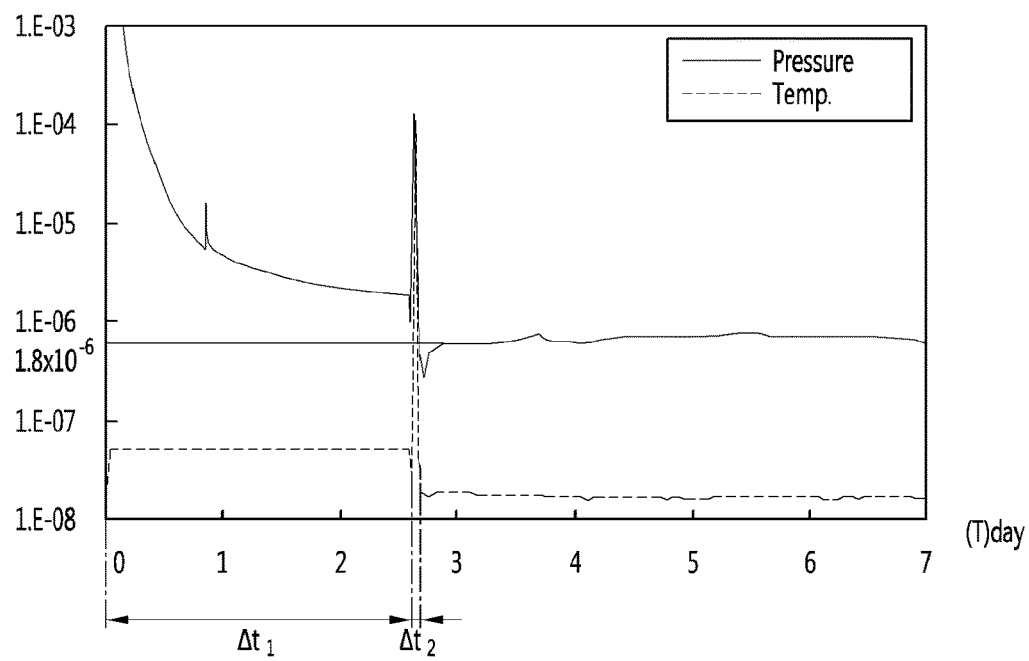
FIG. 10 is a graph illustrating results obtained by observing a time and a pressure in a process of exhausting the inside of the vacuum adiabatic body when a supporting unit is used.

FIG. 10 is a graph illustrating results obtained by observing a time and a pressure in a process of exhausting the inside of the vacuum adiabatic body when a supporting unit 30 is used.

Referring to FIG. 10, in order to create the vacuum space part 50 to be in the vacuum state, a gas in the vacuum space part 50 is exhausted by a vacuum pump while evaporating a latent gas remaining in the parts of the vacuum space part 50 through baking. However, if the vacuum pressure reaches a certain level or more, there exists a point at which the level of the vacuum pressure is not increased any more ($\Delta T_1$). After that, the getter is activated by disconnecting the vacuum space part 50 from the vacuum pump and applying heat to the vacuum space part 50 ($\Delta T_2$). If the getter is activated, the pressure in the vacuum space part 50 is decreased for a certain period of time, but then normalized to maintain a vacuum pressure of a certain level. The vacuum pressure that maintains the certain level after the activation of the getter is approximately $1.8 \times 10^{-6}$ Torr.

In the embodiment, a point at which the vacuum pressure is not substantially decreased any more even though the gas is exhausted by operating the vacuum pump is set to the lowest limit of the vacuum pressure used in the vacuum adiabatic body, thereby setting the minimum internal pressure of the vacuum space part 50 to $1.8 \times 10^{-6}$ Torr.

Figure 11:
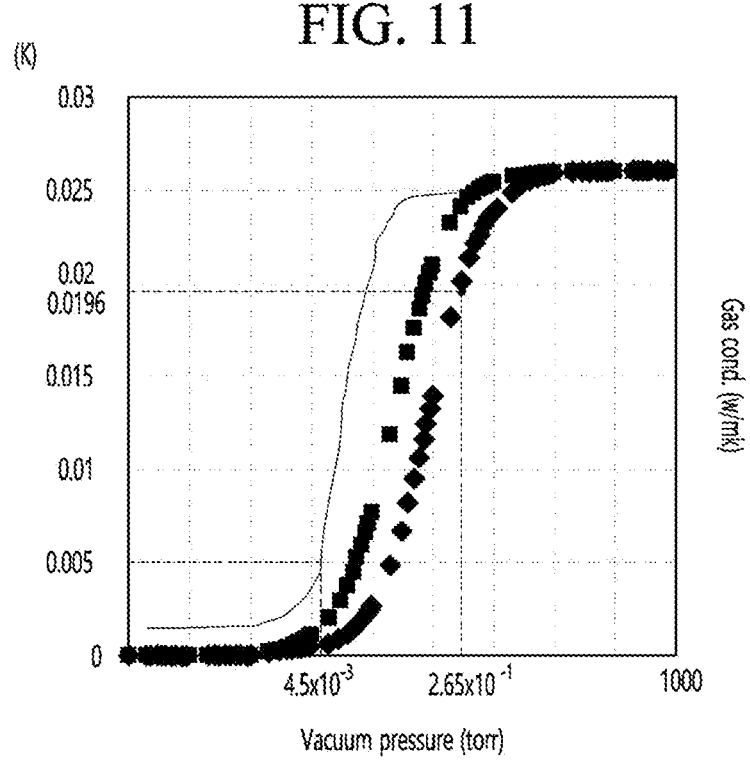
FIG. 11 is a graph illustrating results obtained by comparing a vacuum pressure with gas conductivity.

FIG. 11 is a graph obtained by comparing a vacuum pressure with gas conductivity.

Referring to FIG. 11, gas conductivities with respect to vacuum pressures depending on sizes of a gap in the vacuum space part 50 are represented as graphs of effective heat transfer coefficients (eK). Effective heat transfer coefficients (eK) were measured when the gap in the vacuum space part 50 has three sizes of 2.76 mm, 6.5 mm, and 12.5 mm. The gap in the vacuum space part 50 is defined as follows. When the radiation resistance sheet 32 exists inside the vacuum space part 50, the gap is a distance between the radiation resistance sheet 32 and the plate member 10 or 20 adjacent thereto. When the radiation resistance sheet 32 does not exist inside the vacuum space part 50, the gap is a distance between the first and second plate members 10 and 20.

It was seen that, since the size of the gap is small at a point corresponding to a typical effective heat transfer coefficient of 0.0196 W/mK, which is provided to a adiabatic material formed by foaming polyurethane, the vacuum pressure is $2.65 \times 10^{-1}$ Torr even when the size of the gap is 2.76 mm. Meanwhile, it was seen that the point at which reduction in adiabatic effect caused by gas conduction heat is saturated even though the vacuum pressure is decreased is a point at which the vacuum pressure is approximately $4.5 \times 10^{-3}$ Torr. The vacuum pressure of $4.5 \times 10^{-3}$ Torr may be defined as the point at which the reduction in adiabatic effect caused by gas conduction heat is saturated. Also, when the effective heat transfer coefficient is 0.1 W/mK, the vacuum pressure is $1.2 \times 10^{-2}$ Torr.

When the vacuum space part 50 is not provided with the supporting unit 30 but provided with the porous material 33, the size of the gap ranges from a few micrometers to a few hundreds of micrometers. In this case, the amount of radiation heat transfer is small due to the porous material 33 even when the vacuum pressure is relatively high, i.e., when the vacuum degree is low. Therefore, an appropriate vacuum pump is used to adjust the vacuum pressure. The vacuum pressure appropriate to the corresponding vacuum pump is approximately $2.0 \times 10^{-4}$ Torr. Also, the vacuum pressure at the point at which the reduction in adiabatic effect caused by gas conduction heat is saturated is approximately $4.7 \times 10^{-2}$ Torr. Also, the pressure where the reduction in adiabatic effect caused by gas conduction heat reaches the typical effective heat transfer coefficient of 0.0196 W/mK is 730 Torr.

When the supporting unit 30 and the porous material 33 are provided together in the vacuum space part 50, a vacuum pressure may be created and used, which may be a middle pressure between the vacuum pressure when only the supporting unit 30 is used and the vacuum pressure when only the porous material 33 is used.

In the description of the present disclosure, a part for performing the same action in each embodiment of the vacuum adiabatic body may be applied to another embodiment by properly changing the shape or dimension of foregoing another embodiment. Accordingly, still another embodiment may be easily proposed. For example, in the detailed description, in the case of a vacuum adiabatic body suitable as a door-side vacuum adiabatic body, the vacuum adiabatic body may be applied as a main body-side vacuum adiabatic body by properly changing the shape and configuration of a vacuum adiabatic body.

Hereinafter, the configurations of the supporting unit and the peripheral portion for solving such limitations will be described.

Figure 12:
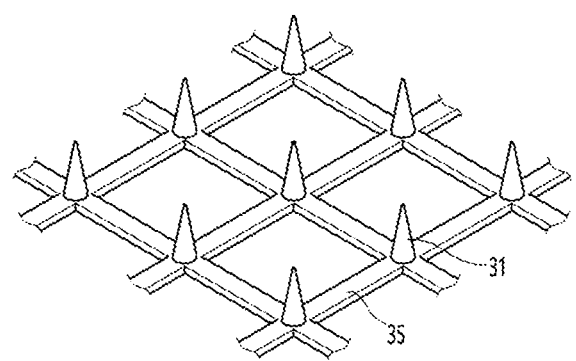
FIG. 12 is a perspective view of a supporting unit according to an embodiment.

FIG. 12 is a perspective view of the supporting unit according to an embodiment.

Referring to FIG. 12, the supporting unit 30 may include a support plate 35 provided in a plane with a lattice structure and bars 31 extending in a direction facing each other on one surface of the support plate 35.

The support plate 35 is provided in a lattice shape so that the heat transfer between the plate members 10 and 20 contacting the support plate 35 may be reduced. One end of the bar 31 may be provided to contact the support plate 35 and to be supported by the support plate 35, and the other end of the bar 31 may directly contact inner surfaces of the plate members 10 and 20. One end of the bar 31 may be provided as one body to the support plate 35 and may be provided as a single injection process. Another article may be inserted into the contact surface of the other end of the bar 31 and the plate member 10 and/or 20, but the other article is not for the purpose of reinforcing the strength of the bar 31. The above-mentioned contact between the support plate 35 and the plate member 10 or 20 may be defined as point contact, which is different from a line contact between the support plate 35 and the plate member 10 or 20. However, it may be understood that it has a predetermined area even if it is the point contact, and it may be understood that it is contrasted with the line contact.

One end of the bar 31 is provided with a larger cross-sectional area than the other end of the bar 31. The other end of the bar 31 may directly contact a plate members 10 or 20, and such other end may be provided with a smaller cross-sectional area than the one end of the bar 31 contacting the support plate 35. Thus, an amount of thermal conduction transferred from the plate members 10 and 20 to the supporting unit 30 may be greatly reduced. Accordingly, the adiabatic efficiency of the vacuum adiabatic body may be improved. The bar 31 may be provided in a circular or cylindrical shape, or alternatively, as shown, a cone shape due to the changing cross-sectional area between the one end and the other end. A cross-section of the bar 31 may have a circular shape.

According to one aspect of the present disclosure, the bar 31 may have a conical shape. Thus, defects may be prevented during injection molding, and convenience of production may be achieved. A diameter of the circular cross-section of the bar may be reduced linearly, such as in a straight line shape, so that injection may be more convenient, and the structural strength may increase.

The bar 31 is provided at each intersection of the support plate 35 in the lattice shape so that stress due to a vacuum pressure received by the bar 31 is stably supported on the structure of the support plate 35.

A surface contacting the support plate 35 may be one of the first plate member 10 and the second plate member 20.

In some cases, the support plate 35 may contact the first plate member 10 providing the internal surface of the refrigerator 1. The internal space of the refrigerator may have a maximized or enlarged inner volume, but a separate plate may be provided in the external space for decoration and/or to cover a curvature of the second plate member 20 occurring when the bar 31 contacts the second plate member 20. In the case in which the separate plate is provided in the internal space of the refrigerator, the opposite case may also be provided.

In other cases, the support plate 35 may contact the first plate member 20 providing the external surface of the refrigerator. In this case, the bar 31 may contact the first plate member 10 so that a narrow portion of the bar 31 contacts the first plate member 10. Thus, cold air within the refrigerator may significantly reduce an amount of heat conducted to the supporting unit 30. Hereinafter, in consideration of improving the adiabatic efficiency of the vacuum adiabatic body, the support plate 35 may contact a side of the second plate member 20. However, the scope of the present invention is not limited to such a form as described above.

Figure 13:
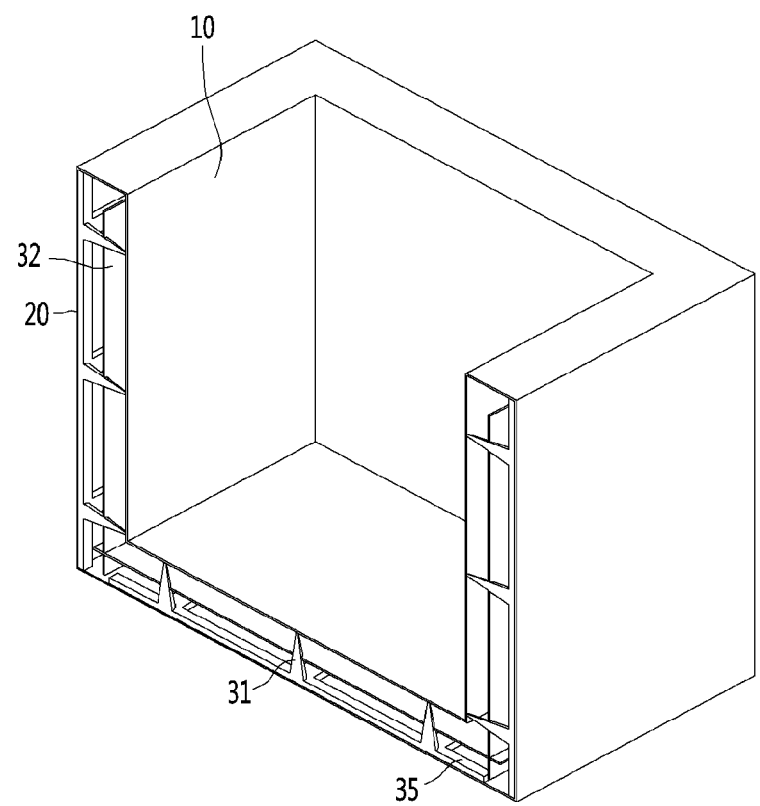
FIG. 13 is a partial cross-sectional view of the vacuum adiabatic body according to an embodiment.
Figure 14:
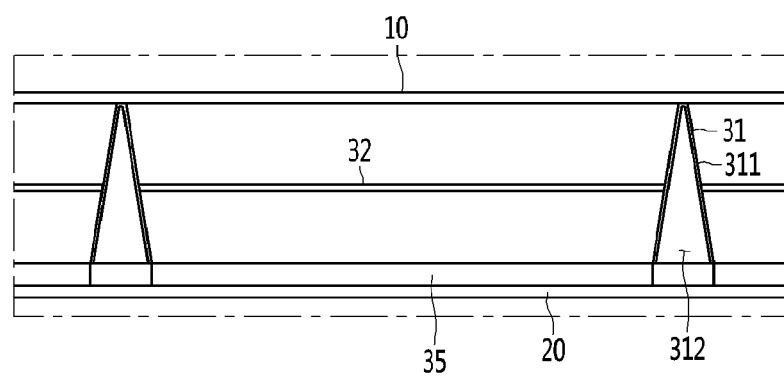
FIG. 14 is a front view of the cross-section of FIG. 13 when viewed from a front side.

FIG. 13 is a partial cross-sectional view of the vacuum adiabatic body according to an embodiment, and FIG. 14 is a front view of the cross-section of FIG. 13 when viewed from a front side.

Referring to FIGS. 13 and 14, the first plate member 10 faces an inner surface side of the vacuum adiabatic body, that is, the inner side of the refrigerator 1, and the second plate member 20 faces the outer surface side of the vacuum adiabatic body, that is, the outer side of the refrigerator 1. The support plate 35 may contact an inner surface of the second plate member 20. The bar 31 may extend from the support plate 35 to contact the inner surface of the first plate member 10 that faces the second plate member 20. The support plate 35 is provided on only one side of the plate member 10 or 20 and not on the other side. Thus, an amount of resin for manufacturing the supporting unit 30 may be reduced, and the convenience of the operator may be improved.

A portion of the bar 31, which contacts the support plate 35, has a large cross-sectional area, and a portion of the bar 31, which contacts the first plate member 10, has a narrow cross-sectional area. Due to this configuration, the thermal conduction from the first plate member 10 to the supporting unit 30 may be reduced. Also, since the cross-sectional area of the portion contacting the support plate 35 is wide, stress due to the vacuum pressure applied to the bar 31 may be sustained.

The bar 31 may be hollow to have a structure in which the inside is empty. The bar may be provided as an outer wall part 311 having an empty hollow portion or space 312 therein. Since the bar 31 is made of a resin, the larger an amount of consumed resin increases, the more an amount of outgassing increases, thereby causing destruction of the vacuum pressure of the vacuum adiabatic body. The destruction of the vacuum pressure is more prominent as the service life of the product becomes longer, which is a particularly required configuration for increasing the service life of the product.

In addition, this is because the shape of the raw material of the supporting unit 30 increases, and the internal structure of the bar 31 does not greatly affect the moment of inertia. Thus, it does not greatly contribute to the improvement of the buckling strength.

As already described, the cross-sectional area of the bar 31 is provided in a shape that becomes narrower in one direction. For example, the diameter (ϕspacer) of the portion contacting the support plate 35 may be provided to be larger than the diameter (ϕhole) at which the radiation resistance sheet 32 is mounted. A cusp of the bar 31, that is, a portion in contact with the inner surface of the first plate member 10, may be provided as a tangent point to drastically reduce thermal conduction.

The radiation resistance sheet 32 may be supported on the outer wall part 311. The radiation resistance sheet 32 may be mounted on the outer wall part of the bar 31 and be stopped from moving downward. A hole (such as hole 316 in FIG. 15 or hole 335 in FIG. 19) through which the bar 31 is inserted may be defined in the radiation resistance sheet 32, and the position of the radiation resistance sheet 32 may be determined according to a size of the hole. The upward movement of the radiation resistance sheet 32 may be stopped by the coupling between the radiation resistance sheets 32.

The stopping action of the upward movement of the radiation resistance sheet 32 will be described in more detail. The vacuum adiabatic body according to an embodiment may be applied to the main body 2 of the refrigerator 1. The main body 2 of the refrigerator 1 may have a three-dimensional space, and the radiation resistance sheet 32 may contact with each other at each edge. The radiation resistance sheets 32 may be stopped at the positions, specifically, the upward movement by being coupled to each other at the edges contacting each other. In addition, the downward movement may be stopped.

The number of bars 31 may vary depending on various factors such as magnitude of the vacuum pressure and the stress, a size of the vacuum adiabatic body, and a thickness of the vacuum adiabatic body. In the drawings, nine bars are provided.

Hereinafter, details will be described with reference to the accompanying drawings.

Figure 15:
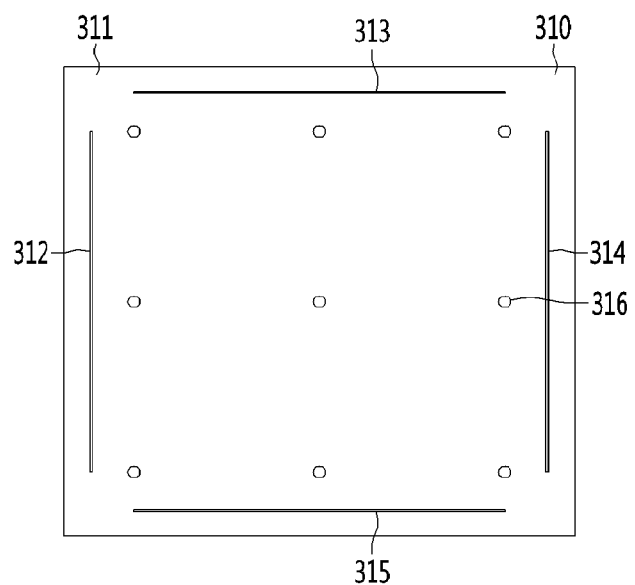
Figure 16:
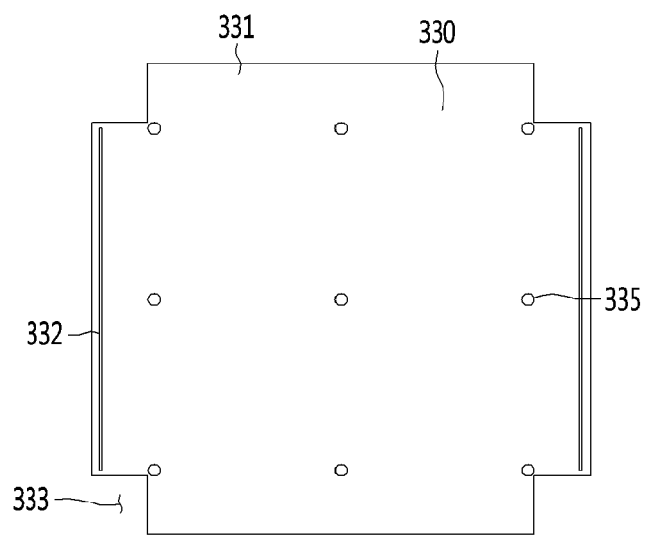

FIGS. 15 and 16 are views illustrating two types of radiation resistance sheets 32 different from each other. FIG. 15 is a view of a first radiation resistance sheet 310 applied to a bottom surface, and FIG. 16 is a plan view of a second radiation resistance sheet applied to a side surface.

Referring to FIG. 15, the first radiation resistance sheet 310 may be a square or rectangular plate 311 having a rectangular shape corresponding to the edges of the refrigerator 1. As described above, the first radiation resistance sheet 310 may be applied to the bottom surface of the refrigerator 1.

A bar insertion hole 316 through which the bar 31 is inserted is provided in a surface of the first radiation resistance sheet 310 so that the bar 31 is inserted and supported. When the bar 31 contacts the bar insertion hole 316, one-way movement of the first radiation resistance sheet 310 may be stopped. The supporting action of the bar 31 and the bar insertion hole 316 is not essential. This is because the position of the radiation resistance sheet 31 is fixed by the coupling between the radiation resistance sheets 310.

Insertion slits 312, 313, 314, and 315, which are cut along the edge direction, are provided in inner portions of the edge of the first radiation resistance sheet 310, respectively. The edges of an adjacent radiation resistance sheet 310 and/or the second radiation resistance sheet 330 may be inserted into the insertion slits 312, 313, 314, and 315.

Briefly, the edges of the second radiation resistance sheet 330 adjacent to the insertion slits 312, 313, 314, and 315 of the first radiation resistance sheet 310 are inserted to complete a structure for only the radiation resistance sheets 310 and 330. This will be described in more detail with reference to the other drawings.

Referring to FIG. 16, the second radiation resistance sheet 330 is provided with an approximate rectangular plate 331 having a chamfered or cut-out vertex. The vertex of the rectangular plate 331 is provided with a chamfered or cut-out part 333. An insertion piece 334 may be disposed at each edge of the rectangular plate 331 by the chamfered part 333. The insertion piece 334 may be inserted into the insertion slit 312. The chamfered part 333 is provided in a rectangular shape, but is not limited thereto. For example, the chamfered part 333 may be any shape that allows the insertion piece 334 to be fitted in the insertion slit 312.

One or more of the insertion pieces 334 may be provided with an insertion slit 332. The insertion slit 332 has a configuration in which the insertion piece 334 of the adjacent second radiation resistance sheet 330 is inserted.

Figure 17:
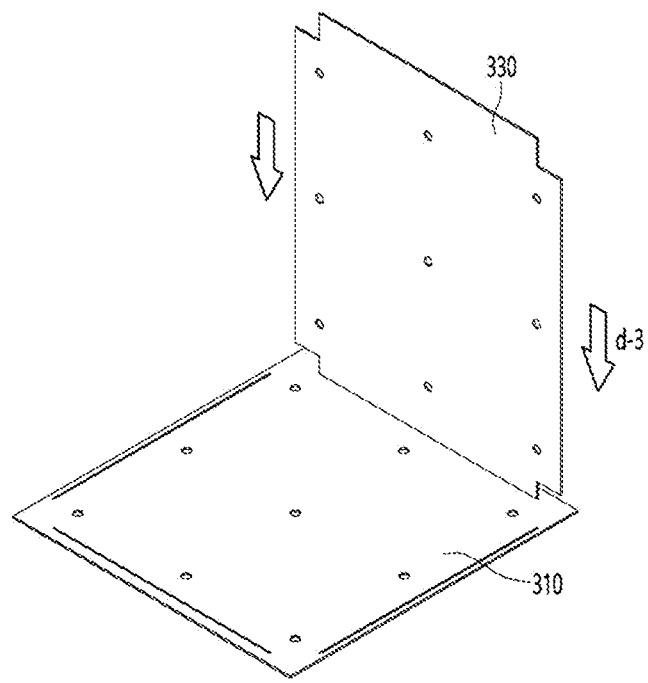
FIG. 17 is a view illustrating a state in which the second radiation resistance sheet is coupled to the first radiation resistance sheet.

FIG. 17 is a view illustrating a state in which the second radiation resistance sheet 330 is coupled to the first radiation resistance sheet 310.

Referring to FIG. 17, the first radiation resistance sheet 310 may be placed at the bottom so that the second radiation resistance sheet 330 is coupled. Particularly, the insertion pieces 334 of the second radiation resistance sheet 330 are inserted into the insertion slits 312, 313, 314, and/or 315 of the first radiation resistance sheet 310 to fix the insertion pieces 334 and the insertion silts 332. The other second radiation resistance sheet 330 may be coupled to the first radiation resistance sheet 310 in the same manner.

The coupling between the second radiation resistance sheets 330 may be performed by coupling the neighboring second radiation resistance sheets 330 to each other. Particularly, the insertion piece 334 of one of the second radiation resistance sheets 330 may be inserted into the insertion slit 332 of the other of the second radiation resistance sheets 330 to fix the insertion piece 334 and the insertion slit 332. Of course, the second radiation resistance sheet 330 may be coupled in another manner. For example, one of the two second radiation resistance sheets 330 is provided with two insertion slits 332, and the other two second radiation resistance sheets 330 are not provided with insertion slits so that the insertion of the other two radiation resistance sheets 330, and the insertion piece 334 may be inserted into and fixed to the two insertion slits 332 of any one of the second radiation resistance sheets 330. Other methods can be considered sufficiently.

Figure 18:
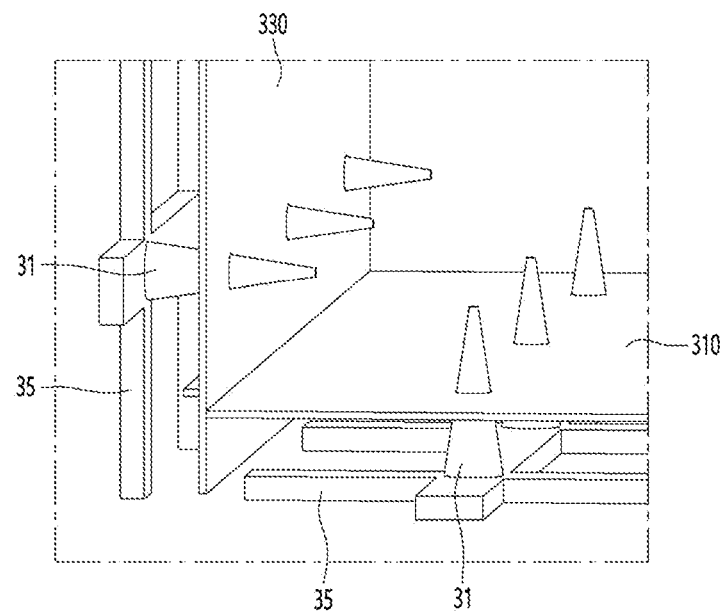
FIG. 18 is a view of any one side edge to which the radiation resistance sheet is coupled.

FIG. 18 is a view of any one side edge to which the radiation resistance sheet is coupled.

Referring to FIG. 18, it is seen that the insertion piece 334 of the other second radiation resistance sheet 330 adjacent to the insertion slit 332 of one of the second radiation resistance sheets 330 is inserted. Although not shown, the other insertion piece 334 of the second radiation resistance sheet 330 may be inserted into the insertion slits 312, 313, 314, and/or 315 of the first radiation resistance sheet 310.

According to this configuration, since the sheets 310 and 330 comprising the radiation resistance sheet 32 are coupled at all the edges adjacent to each other, the three-dimensional structure may be supported without the assisting of other structures. Alternatively, since the radiation resistance sheet 32 is provided as a thin plate, it may be supported by the bar 31 at several points. Nevertheless, it is not necessary for the bar 31 to support the radiation resistance sheet 32 as a whole. Therefore, thermal conduction occurring at the contact point between the radiation resistance sheet 32 and the bar 31 may be reduced, and the adiabatic efficiency of the vacuum adiabatic body may be further improved.

The radiation resistance sheet 32 is made of a metal material. When the radiation resistance sheet 32 contacts the plate members 10 and 20, rapid thermal conduction occurs to lead to adiabatic failure of the vacuum adiabatic body. To solve this limitation, a spacing part may be further provided to prevent the movement of the vacuum adiabatic body according to an embodiment.

In the supporting unit having the above configuration, since the worker inserts the narrow top end of the bar 31 into the wide bar insertion hole 316, the convenience of the operation may be improved, and the respective radiation resistance sheets 310, 320 may be coupled together as one body. Thus, when manufactured, convenience may be further improved.

Figure 19:
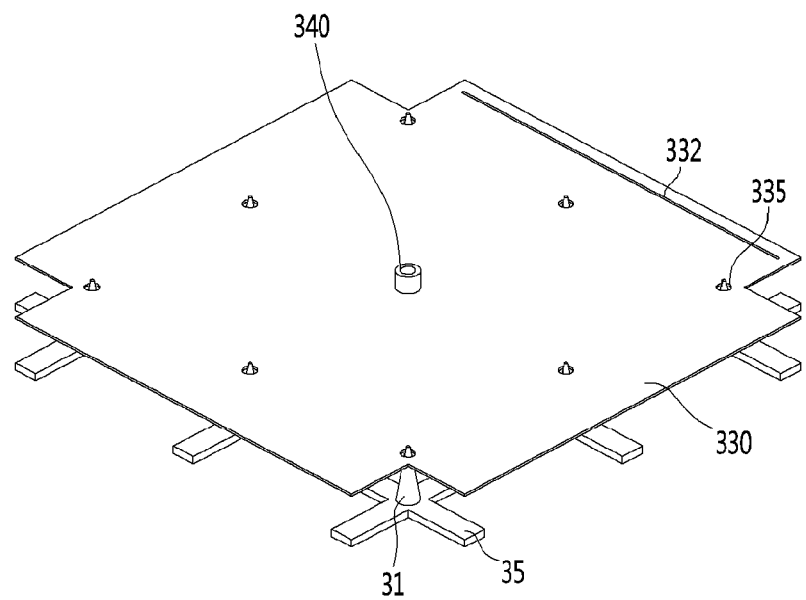
FIG. 19 is a perspective view of a supporting unit to which a spacing member is applied.
Figure 20:
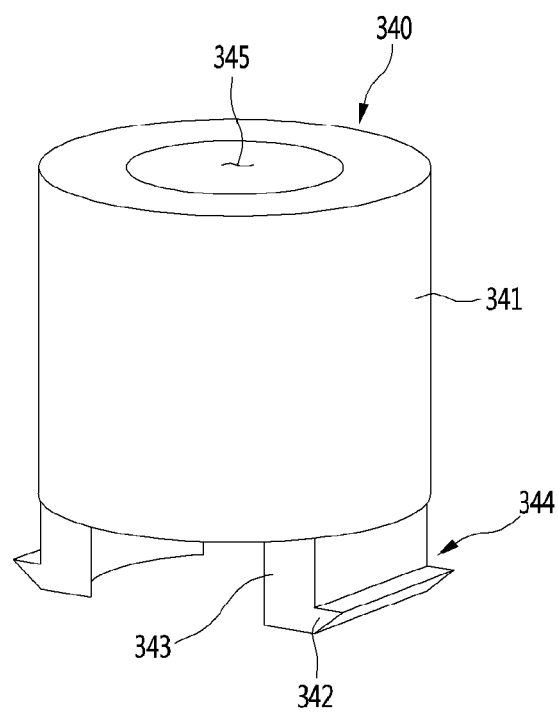
FIG. 20 is a perspective view of the spacing member.

FIG. 19 is a perspective view of a supporting unit to which a spacing member or spacer is applied, and FIG. 20 is a perspective view of the spacing member.

Referring to FIG. 19, the bar 31 is disposed on the support plate 35. The bar 31 is inserted into a bar insertion hole 335 of the radiation resistance sheet 31. The second radiation sheet 330 in the drawing is used to illustrate the radiation resistance sheet 31.

A spacing member 340 may be inserted into the bar 31, which may be provided at a center of the second radiation resistance sheet 330. The spacing member 340 may be supported on the bar 31 while holding the second radiation resistance sheet 330. According to the spacing member 340, the second radiation resistance sheet 330 does not move upward with reference to the drawing.

According to this configuration, the second radiation resistance sheet 330 and the first radiation resistance sheet 310 may be maintained in an installation by the coupling operation of the insertion slit 332 and the insertion piece 334, the bar 31 penetrating the radiation resistance sheet 32, and the spacing member 340, which may maintain the gap between the radiation resistance sheet 32 and the plate member 10 or 20. The spacing member 340 is provided in the middle portion of the radiation resistance sheet 31. This is because the edge portion is held in position by the coupling between the radiation resistance sheets 32, but the middle portion of the radiation resistance sheet 31 is not the furthest from the edge portion but is the weakest point at which drooping by self-weight occurs.

Referring to FIG. 20, the spacing member 340 includes a column part or cylindrical portion 341 and a sheet insertion part 344, which may include a hook protrusion 342 provided below the column part 341 and an elastic deformation part 343.

The inside of the column part 341 may be hollow to have an empty space defining a bar insertion part or space 345, and the bar 31 is inserted into the inside thereof to be inside the bar insertion part 345. An upper end of the column part 341 may contact the plate members 10 and 20. The elastic deformation part 343 is provided at an interval between the end of the hook protrusion 342 and the column part 341. The outer side of the elastic deformation part 343 may be part of the sheet insertion part 344. The position of the radiation resistance sheet 32 may be fixed by having the bar 31 and the sheet insertion part 344 inserted into the bar insertion hole 335 of the radiation resistance sheet 32.

The position of the radiation resistance sheet 32 is fixed by the sheet inserting part 344, and the position of the upper end of the column portion 341 is fixed to the plate member 10. As a result, the spacing between the plate member 10 and the radiation resistance sheet 32 may be maintained to be spaced apart from each other by a distance corresponding to a height or length of the column part 341.

A lower end of the hook protrusion 342 may be tapered or inclined so that the sheet insertion part 344 may be inserted into the radiation resistance sheet 32.

The bar 31 may be inserted into the bar insertion part 345 in a state in which the spacing member 340 is supported by the radiation resistance sheet 32. A top of the column part 341 may have an opening to allow access to the bar insertion part 345 so that the bar 31 may contact the first or second plate 10 or 20.

The spacing member 340 may be applied to all the radiation resistance sheets 32 (310 and 330) when the size of the vacuum adiabatic body is large. Alternatively, it may be installed only on the surface which is not susceptible to the deformation of the radiation resistance sheet 32, not on the radiation resistance sheet 32 of all the surfaces. In the case of the radiation resistance sheet 32 disposed on the upper side, it may be more preferably applied to the upper side when viewing the rear side through the opening of the refrigerator 1. This is because the drooping of the radiation resistance sheet 32 due to its own weight may occur more in the case of the upper side.

Figure 21:
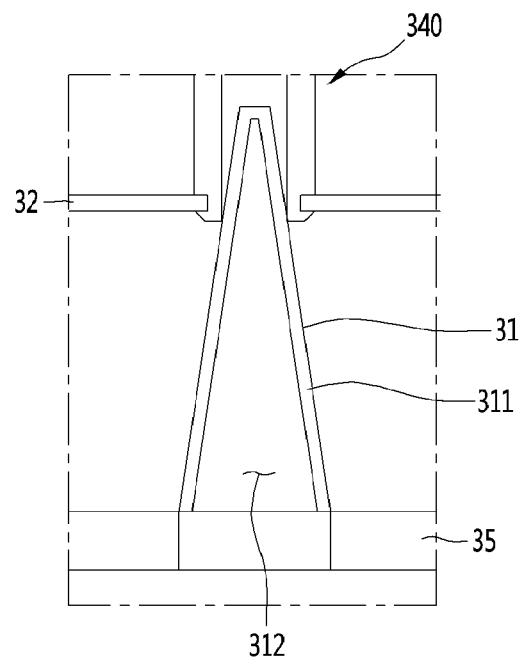
FIG. 21 is a cross-sectional view of a bar in a state in which the spacing member is installed.

FIG. 21 is a cross-sectional view illustrating a state in which the spacing member 340 is installed.

Referring to FIG. 21, the bar 31 is inserted into the bar insertion portion 345 in a state in which the radiation resistance sheet 32 is hooked with the hook protrusion 342 of the sheet insertion part 344. A lower end of the hook protrusion 342 is supported on the outer surface of the bar 31.

As has been described above, the bar 31 is provided to the outer wall part 311 and the empty hollow portion 312 so that an amount of resin required for manufacturing the supporting unit 30 is reduced.

As described above, one side of the bar 31 adjacent to the support plate 35 has a larger cross-sectional area than that of the other side of the bar 31 adjacent to the plate member 10 or 20. This is in consideration of the vacuum adiabatic characteristics, and the cross-sectional shapes of various bars will be discussed below.

In the following description, it is assumed that the cross-sectional area, that is, a diameter of the lower end of the bar 31 is the same. Since the cross-section of the bar 31 is provided in a circular shape for convenience of the injection or the like, the cross-sectional area may be proportional to the square of the diameter. It is also assumed that the spacing, number, material, and height of the bars are the same.

Figure 22:
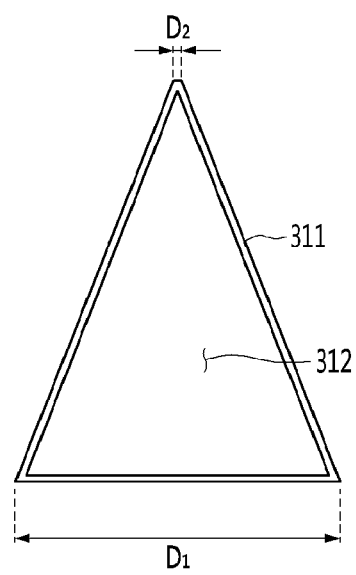
FIGS. 22 to 25 are views for explaining various kinds of bars based on a vertical cross-section.
Figure 23:
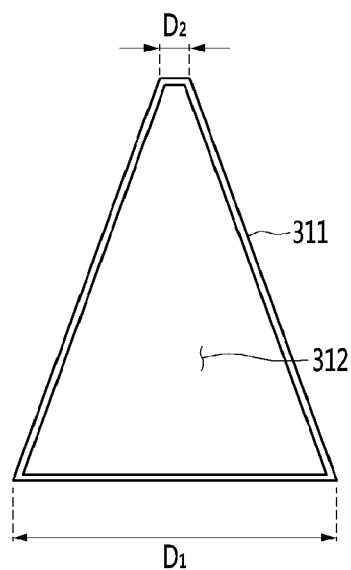

FIGS. 22 to 25 are vertical cross-sectional views of the bar, in which an outer wall part 311 and an empty hollow part 312 are provided in each of the bars 31. A diameter of a lower end of each bar is the same as D1, and a diameter of an upper end is different as D2. In the following description, the case of FIG. 22 is referred to as A, the case of FIG. 23 as B, the case of FIG. 24 as C, and the case of FIG. 25 as D.

First, when observed from the aspect of thermal conductivity, the smaller the length of the upper diameter D2, the smaller the contact area with the plate member 35, and thus, the heat loss may be reduced. The thermal conductivity may increase in order of A<B<C<D. The case A of FIG. 22 may be provided to increase the adiabatic efficiency of the vacuum adiabatic body.

Figure 25:
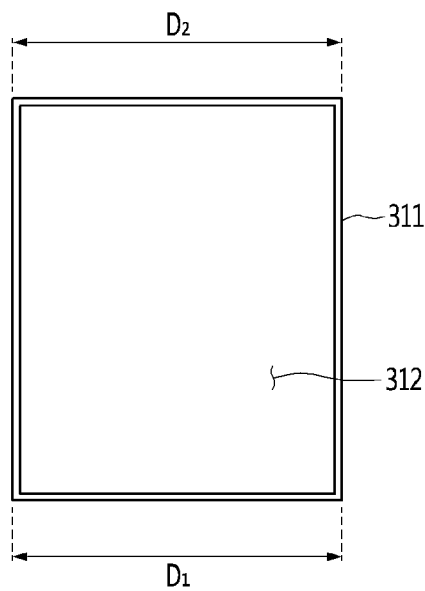

Second, when observed from the aspect of the structural strength corresponding to the vertical load, the smaller the length of the upper end or diameter D2 of the bar 31, the more the load is concentrated, which is disadvantageous in terms of structural strength. The structural strength of the vertical load may increases in order of A<B<C<D. The case D of FIG. 25 is advantageous in terms of the structural strength corresponding to the vertical load of the bar 31.

Third, when observed from the viewpoint of the structural strength corresponding to shear stress, the case of the bar 31 having a triangular structure is advantageous for the shear stress. The structural strength of the shear stress may decreases in order of A>B>C>D. The case A of FIG. 22 is advantageous in terms of the structural strength of the share stress.

Fourth, in terms of surface roughness, the greater the length of the upper end or diameter D2 of the bar 31, the more the surface roughness is uniformly maintained. In addition, since the drooping of the plate member 10 or 20 is less, an adiabatic thickness may be uniformly maintained. The surface roughness may decrease in order of A>B>C>D, and the case D of FIG. 25 may maintain a small and uniform surface roughness of the vacuum adiabatic body.

Fifth, in terms of outgassing, as an amount of resin for manufacturing the supporting unit 30 increases, the more an amount of outgassing increases, and thus, the vacuum maintenance may be disadvantageous. The amount of outgassing may increase in order of A<B<C<D, and the case A of FIG. 22 may improve the vacuum performance corresponding to the use of the vacuum adiabatic body for a long time.

Figure 24:
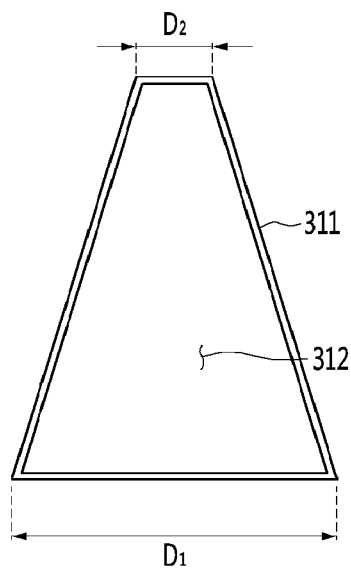

When considering the above-mentioned various examination conditions, the bar 31 illustrated in FIG. 24 may be further examined. That is, a conical or truncated cone shape having a smaller cross-sectional area on the plate member 10 or 20 than a cross-sectional area of the support plate 35 may be considered.

Figure 26:
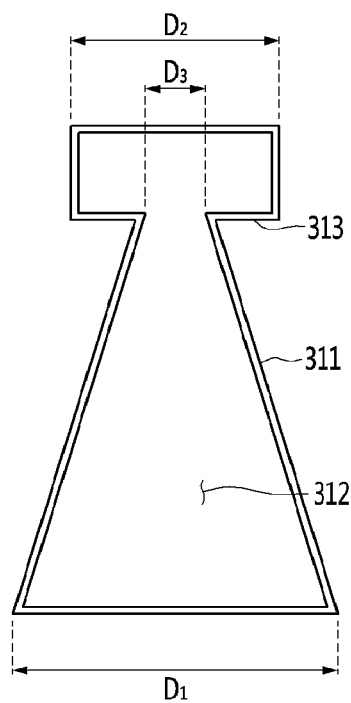
FIG. 26 is a vertical cross-sectional view of a bar according to another embodiment.

FIG. 26 is a vertical cross-sectional view of a bar according to another embodiment.

Referring to FIG. 26, a bar 31 according to this embodiment includes a recess part or stepped portion 313, and a diameter D3 of the recess part 313 may be smallest as compared with other portions (such as the diameter of the end D2). Thus, it may satisfy all the five requirements already reviewed. However, to provide the recess part 313, injection may be difficult, and it is difficult to obtain the uniformity of the shape. Thus, it is not suitable for application.

Under the above background, the shape provided in FIG. 24 may be proposed as an advantageous vertical cross-sectional shape.

The vacuum adiabatic body proposed in the present disclosure may be preferably applied to refrigerators. However, the application of the vacuum adiabatic body is not limited to the refrigerators, and may be applied in various apparatuses such as cryogenic refrigerating apparatuses, heating apparatuses, and ventilation apparatuses.

INDUSTRIAL APPLICABILITY

According to the embodiments, it may be possible to prevent the deterioration of the adiabatic performance due to the long-term use of the vacuum adiabatic body so as to reduce the adiabatic loss and to improve the work convenience. Therefore, the disclosure may be expected to be greatly applied as a disclosure that greatly contributes to actual commercialization of the vacuum adiabatic body.

The invention claimed is:

1. A vacuum adiabatic body, comprising:
   a first plate;
   a second plate, a vacuum space being provided between the first plate and the second plate; and
   a support positioned in the vacuum space and adjacent to the first plate, the support including:
      a support plate extending in a first direction and configured to contact one of the first plate or the second plate;
      at least one bar extending between the support plate and the other one of the first plate or the second plate in a second direction that differs from the first direction, the at least one bar including a first bar and a second bar; and
      a sheet provided between the first plate and second plate, the sheet including a first sheet having a first hole through which the first bar passes and a second sheet having a second hole through which the second bar passes, and
   wherein the second sheet s coupled to an edge of the first sheet such that the first sheet and the second sheet extend in directions crossing each other.

2. The vacuum adiabatic body of claim 1, wherein the at least one bar includes a first end configured to connect with the support plate and a second end configured to contact the other one of the first plate or the second plate, and wherein the first end is integrally formed with the support plate.

3. The vacuum adiabatic body of claim 2, wherein the other one of the first plate or the second plate includes an inner surface facing the vacuum space, and
wherein the second end of the at least one bar is configured to directly contact the inner surface of the other one of the first plate or the second plate.

4. The vacuum adiabatic body of claim 2, wherein a diameter of the at least one bar at the second end is less than a diameter of the at least one bar at the first end.

5. The vacuum adiabatic body of claim 2, wherein the at least one bar is shaped such that a cross-sectional area of the at least one bar gradually decreases along the at least one bar in a direction from the first end of the at least one bar and towards the second end of the at least one bar.

6. The vacuum adiabatic body of claim 2, wherein the at least one bar includes an outer wall defining a hollow portion, and
wherein the outer wall includes the first end and the second end.

7. The vacuum adiabatic body of claim 6, wherein the outer wall of the at least one bar includes a slant surface configured to extend obliquely from the first end and toward the second end with respect to the second direction.

8. The vacuum adiabatic body of claim 2, wherein a cross-section of the at least one bar has a triangle shape including a side defined by the first end and an apex defined by the second end.

9. The vacuum adiabatic body of claim 2, wherein a cross-section of the at least one bar has a trapezoid shape or rectangular shape, which includes a first side defined by the first end and a second side defined by the second end.

10. The vacuum adiabatic body of claim 1, wherein the at least one bar includes:
an outer wall extending from the support plate, a diameter of the outer wall decreasing in a direction away from the support plate;
an extension extending from an end of the outer wall and having a diameter greater than the diameter of the outer wall at the end; and
a stepped portion provided between the outer wall and the extension.

11. The vacuum adiabatic body of claim 1, wherein the sheet is positioned adjacent to the first plate.

12. The vacuum adiabatic body of claim 11, wherein the sheet includes a bar insertion hole through which the at least one bar is inserted, and
wherein the at least one bar includes a slant surface configured to extend obliquely with respect to the second direction, the slant surface contacting the sheet at the bar insertion hole.

13. The vacuum adiabatic body of claim 11, wherein the a first sheet includes an insertion slit, and the second sheet includes an insertion region coupled to the insertion slit.

14. The vacuum adiabatic body of claim 11, wherein the a first sheet includes an insertion region defined by a cut-out vertex, and the second sheet includes an edge to which the insertion region is coupled.

15. The vacuum adiabatic body of claim 11, further comprising a spacer provided between the sheet and one of the first plate or the second plate,
wherein the spacer includes a column having a through hole in which the at least one bar is inserted and a plurality of legs that extend from the column and are configured to support the sheet.

16. A vacuum adiabatic body, comprising:
a first plate;
a second plate, a vacuum space being provided between the first plate and the second plate;
a sheet provided between the first plate and second plate and having a hole, the sheet being positioned adjacent to the first plate;
a support plate provided in the vacuum space and extending in a first direction;
a bar provided in the vacuum space and extending in a second direction; and
a spacer provided between the sheet and the second plate, the spacer being coupled to the bar,
wherein the bar and the spacer are configured to be inserted into the hole of the sheet.

17. The vacuum adiabatic body of claim 16, wherein the spacer includes a column having an inner surface configured to support the bar and an outer surface configured to support the sheet.

18. The vacuum adiabatic body of claim 17, wherein the bar includes a slant surface supported by the inner surface of the column, the slant surface of the bar extending obliquely with respect to the second direction.

19. A vacuum adiabatic body, comprising:
a first plate;
a second plate, a vacuum space being provided between the first plate and the second plate;
at least two sheets provided between the first plate and second plate, the at least two sheets being positioned closer to the first plate than to the second plate; and
a bar extending in a first direction in the vacuum space, the bar being configured to pass through one of at least two sheets,
wherein the at least two sheets include a first sheet having an insertion slit and a second sheet having an insertion region received in the insertion slit of the first sheet.

* * * * *